United States Patent [19]

Higuchi et al.

[11] Patent Number: 5,599,888
[45] Date of Patent: Feb. 4, 1997

[54] PROCESS FOR PREPARING METHYL METHACRYLATE POLYMER

[75] Inventors: Yasushi Higuchi; Shojiro Kuwahara; Shinichi Hieda; Masahiro Kurokawa, all of Hiratsuka, Japan

[73] Assignee: Mitsubishi Gas Chemical Company, Inc., Tokyo, Japan

[21] Appl. No.: 324,270

[22] Filed: Oct. 17, 1994

[30] Foreign Application Priority Data

Nov. 9, 1993 [JP] Japan ............................ 5-279861

[51] Int. Cl.⁶ .................................................. C08F 2/38
[52] U.S. Cl. .................................... 526/212; 526/329.7
[58] Field of Search .......................... 526/216, 212, 526/329.7

[56] References Cited

U.S. PATENT DOCUMENTS

| | | | |
|---|---|---|---|
| 2,956,990 | 10/1960 | Fettes | 526/216 |
| 3,234,194 | 2/1966 | Slocum | 526/216 |
| 4,661,571 | 4/1987 | Kato et al. | 526/216 |
| 4,758,642 | 7/1988 | Yezrielev et al. | 526/216 |
| 4,920,187 | 4/1990 | Kashihara et al. | 526/216 |
| 5,028,674 | 7/1991 | Hatch et al. | 526/216 |

FOREIGN PATENT DOCUMENTS

| | | | |
|---|---|---|---|
| 2161909 | 6/1973 | Germany. | |
| 5538850 | 3/1980 | Japan | 526/216 |
| 695633 | 8/1953 | United Kingdom | 526/216 |
| 1194950 | 6/1970 | United Kingdom | 526/216 |

OTHER PUBLICATIONS

Chemical Abstract of JP 62-241905, Abstract No. 56810, 22 Feb. 1988, vol. 108, No. 8, "Solvents for the Polymerization of Methacrylates", Columbus, Ohio.

*Primary Examiner*—Joseph L. Schoefer
*Assistant Examiner*—N. Sarofim
*Attorney, Agent, or Firm*—Frishauf, Holtz, Goodman, Langer & Chick, P.C.

[57] ABSTRACT

A process is provided for preparing a high-quality methyl methacrylate polymer by polymerizing a monomer comprising methyl methacrylate as a main component in the presence of a radical polymerization initiator, a chain transfer agent, and a small amount of methanol as a solvent. The polymerization is carried out in a uniform solution at a temperature of 90° to 180° C. so that a monomer conversion of 40 to 90 mol % is attained. According to this process, a methyl methacrylate polymer is obtained which reduces the generation of silver streaks, voids, coloring, odor and the like at the time of thermal molding.

4 Claims, 4 Drawing Sheets

PROCESS FOR PREPARING METHYL METHACRYLATE POLYMER

BACKGROUND OF THE INVENTION (i) Field of the Invention

The present invention relates to a novel process for preparing a methyl methacrylate polymer, and more specifically, it relates to a process for stably and efficiently preparing a high-quality methyl methacrylate polymer.

(ii) Description of the Related Art

Methyl methacrylate polymers have excellent characteristics with respect of transparency, weathering resistance, mechanical strength and appearance, and therefore they have been used not only as various molding materials such as building materials, furniture and interior decoration materials, car parts and electric parts, but also as optical materials and optical communication materials.

Heretofore, as a preparation method of the methyl methacrylate polymer which has been used as a molding material, a suspension polymerization method has usually been employed, but in this method, the polymer is contaminated with a secondary material such as a suspending dispersant, and for this reason, it is difficult to obtain a high-purity polymer. The polymer manufactured by this method is not suitable for an optical material or the like. Additionally, an after-treatment step for the polymer comprises intricate operations of filtration, washing and drying, and a large amount of waste water must be treated. Thus, the suspension polymerization method is still insufficient as an industrial process. As techniques which can overcome the drawbacks of this suspension polymerization method, much attention has been paid to a continuous mass polymerization method and a solution polymerization method in recent years. These methods permit the manufacture of high-quality resins having excellent optical properties, because the suspending dispersant or the like is not used.

However, in the continuous mass polymerization method is very difficult owing to an autoacceleration effect called "the Trommsdorff effect" which threatens the polymerization reaction being stably controlled, while a high monomer conversion is maintained, and hence the final polymer having a high polymer concentration is scarcely obtained.

Japanese Patent Publication No. 32665/1977 (U.S. Pat. No. 3,900,453) has suggested a continuous mass polymerization method in which a uniform phase reaction is carried out at a relatively low monomer conversion by the use of a tank type reactor and unreacted monomer is continuously separated and removed. In this method, the unreacted monomer remains in large quantities, and for the collection and reuse of the unreacted monomer and for the concentration of the obtained polymer, a large amount of energy must be consumed in a volatilization step. In this case, since the polymer is subjected to a heat history, coloring and modification tend to adversely occur.

On the other hand, as shown in Japanese Patent Publication No. 7845/1980, it is known that according to the solution polymerization method in which benzene or an alkylbenzene is used as a solvent, the viscosity of a reaction solution decreases by the solvent, so that the Trommsdorff effect is inhibited and a stable polymerization reaction is possible at a high monomer conversion.

In the case of such a solution polymerization method, the decrease in the amount of the solvent to be used is limited, and even if the amount of the unreacted monomer which remains in the reaction solution is reduced by increasing the monomer conversion, the content of volatiles inclusive of the solvent cannot be decreased. In consequence, the energy consumption required to remove the volatiles is equal to the case of the mass polymerization method on occasion. In addition, there are problems such as the deterioration of the thermal decomposition resistance of the polymer and the complication of procedures for collecting and reusing the monomer component.

On the other hand, Japanese Patent Application Laid-open No. 241905/1987 discloses a method in which a monomer mixture containing methyl methacrylate as a main component in an aliphatic monovalent alcohol such as methanol as a solvent is subjected to radical polymerization, and the resulting polymer is precipitated in the state of a slurry and then separated. In this method, however, the solvent must be used in a large amount, i.e., in an amount of 80 to 30 parts by weight with respect to 20 to 70 parts by weight of the monomer component, and a precipitation step, a filtration step and a drying step are necessary to separate the polymer. In addition, in the case that this method is utilized as a continuous process, there are many problems which should be industrially solved to uniformly transfer and treat the polymerization solution in the slurry state.

Furthermore, Japanese Patent Application Laid-open No. 201307/1989 discloses a method in which the solution polymerization of a monomer mixture containing methyl methacrylate as a main component is carried out using not less than 5% by weight and less than 30% by weight of a mixed solvent comprising a monovalent alkylalcohol and benzene or an alkylbenzene. In this method, however, the monovalent alkylalcohol merely occupies 5 to 50% by weight of the mixed solvent, and so the method is not such as to fundamentally change a usual method using benzene or the alkylbenzene as the solvent.

In the meantime, the methyl methacrylate polymer begins to decompose from about 230° C., and its decomposition becomes noticeable at about 270° C. On the other hand, this methyl methacrylate polymer can be injection-molded or extruded at 230° C. to 250° C. At this time, the molding temperature of the methyl methacrylate polymer is close to the temperature of its thermal decomposition, so that the monomers formed by the thermal decomposition of the polymer remain in the molded article, which leads to practical problems such as the generation of silver streaks and voids, coloring, the decline of heat deformation resistance and the deterioration of operation circumstances by odor.

In order to improve the thermal decomposition resistance of the methyl methacrylate polymer, various contrivances have been heretofore made. For example, it has been tried that an antioxidant is added at an early stage, followed by heating and molding, but in this case, a sufficient effect cannot be obtained and on the contrary, a drawback such as coloring is observed.

In recent years, it has been disclosed that the methyl methacrylate polymer is manufactured by a continuous polymerization method to improve the thermal decomposition resistance. For example, the above-mentioned Japanese Patent Publication No. 32665/1977 discloses a method where in performing one-stage complete stirring tank type continuous polymerization at a temperature of 130° to 160° C., there is continuously fed a monomer composition which contains 0.01 to 1.0 mol % of a mercaptan as a chain transfer agent and which meets the following formulae, to maintain a monomer conversion at 50 to 78%:

$$10 \geq A^{1/2} \cdot B^{-1/2} \times 10^3$$

$$3 \geq A \cdot B \times 10^5$$

$$2.9 \geq A^{-1} \cdot (B+10.3) \times 10^{-6}$$

wherein A is mols of a radical polymerization initiator in 100 g of the fed monomer; and B is a half-value period (hours) of the radical polymerization initiator at its polymerization temperature.

Moreover, Japanese Patent Publication No. 111408/1991 discloses a method where in performing the one-stage complete stirring tank type continuous polymerization, an initiator having a half-value period of 0.5 to 2 minutes at a polymerization temperature of 130° to 160° C. is used, and an average residence time is set so that a ratio of the half-value period of a radical polymerization initiator at the polymerization temperature to the average residence time may be in the range of 1/200 to 1/10,000, whereby a monomer conversion becomes 45 to 70%.

In these methods, the thermal decomposition resistance in question has been evaluated for the polymers subjected to an after-treatment step such as a vacuum volatilization step for removing residual volatiles such as the unreacted monomer at a high temperature or an extrusion step.

According to investigation by the present inventors, the thermal decomposition resistance of the polymer itself produced in the polymerization step is not always sufficient. In view of the deterioration of yield by the thermal decomposition in an after-treatment step such as the vacuum volatilization step or the extrusion step and the coloring by the heat history, it is very important to improve the thermal decomposition resistance of the polymer produced in the polymerization step.

Furthermore, inventions regarding multi-stage complete stirring tank type continuous polymerization have also been disclosed.

In Japanese Patent Publication Laid-open No. 172401/1989 (U.S. Pat. No. 4,728,701), it is described that characteristics such as thermal stability of the produced polymer can be improved by dividing and feeding parts of a comonomer such as methyl acrylate or ethyl acrylate and a chain transfer agent, but any detailed description about this conception has not been disclosed in examples.

In addition, it has been elucidated from experiments of the present inventors that when the methyl methacrylate polymer having a molecular weight suitable for a molding material is prepared in accordance with the method described in the above-mentioned Japanese Patent Application Laid-open No. 241905/1987, a polymer having an extremely low thermal decomposition resistance is obtained.

SUMMARY OF THE INVENTION

An object of the present invention is to provide a process for economically preparing a high-quality methyl methacrylate polymer through a stably controlled polymerization reaction.

Another object of the present invention is to provide a process for preparing a high-purity colorless methyl methacrylate polymer with a high productivity.

Still another object of the present invention is to provide a process for efficiently preparing a methyl methacrylate polymer which reduces the generation of silver streaks, voids, coloring, odor and the like at the time of thermal molding and which has excellent thermal decomposition resistance.

According to the present invention, there is provided a process for preparing a methyl methacrylate polymer which comprises the step of polymerizing a monomer comprising methyl methacrylate alone or a mixture of 75% by weight or more of methyl methacrylate and 25% by weight or less of an alkyl acrylate having an alkyl group of 1 to 4 carbon atoms in the presence of a radical polymerization initiator and a chain transfer agent, said process comprising the step of adding methanol as a solvent in a ratio of 5 to 29% by weight based on the total weight of the monomer and methanol, and the step of carrying out the polymerization in a uniform solution at a temperature of 90° to 180° C. so that a monomer conversion may be in the range of 40 to 90 mol %.

DESCRIPTION OF THE PREFERRED EMBODIMENTS

Figure 1:
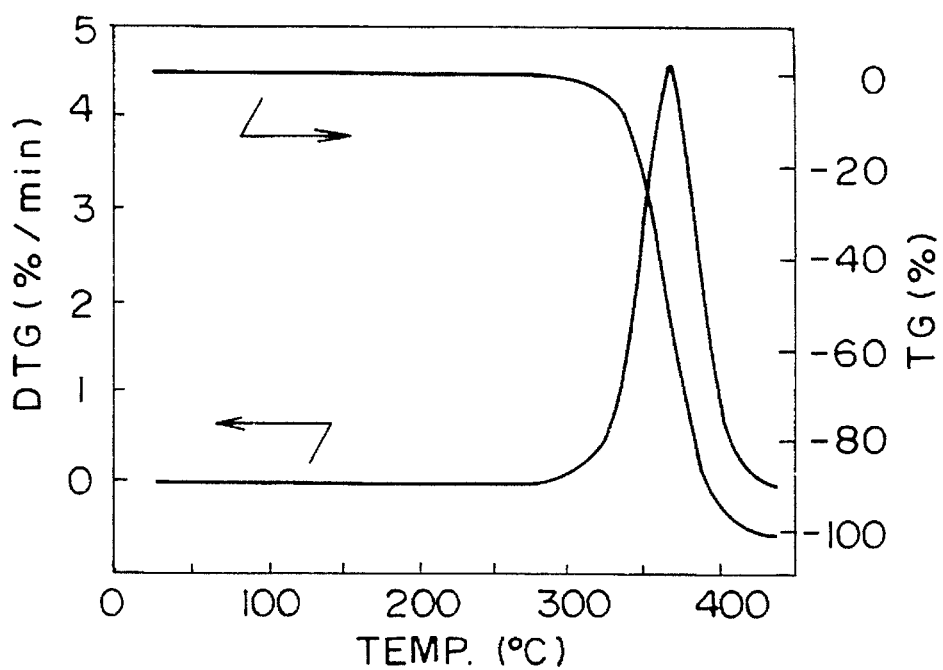
FIG. 1 shows the TG (thermo gravimetry) curve and the DTG (differential thermo gravimetry) curve of a polymer obtained by precipitation and purification in Example 13.

A monomer which can be used in the present invention is methyl methacrylate alone or a mixture of 75% by weight or more of methyl methacrylate and 25% by weight or less of an alkyl acrylate having an alkyl group of 1 to 4 carbon atoms. Here, the alkyl acrylate having the alkyl group of 1 to 4 carbon atoms is an acrylic ester derived from acrylic acid and an alcohol having the alkyl group of 1 to 4 carbon atoms. Examples of the acrylic ester include methyl acrylate, ethyl acrylate, propyl acrylate and butyl acrylate, and above all, methyl acrylate, ethyl acrylate and n-butyl acrylate are particularly preferable. These acrylic esters can be used singly or in a combination of two or more thereof.

In the present invention, methanol can be used as a solvent. This methanol as the solvent has the following features.

(1) Methanol can be completely dissolved in each of monomer components such as methyl methacrylate and the alkyl acrylate irrespective of temperature, and it can also have a sufficient solubility in a methyl methacrylate polymer at a temperature of 100° C. or more. Thus, methanol can maintain the uniformity of the polymer solution in a wide concentration range, and so it is desirable as the solvent for solution polymerization.

(2) As also described in Japanese Patent Application Laid-open Nos. 34071/1975, 241905/1987 and 201307/1989, the viscosity of a polymerization reaction solution is lower in methanol than in a solvent such as an alkylbezene, even if the concentration of the methyl methacrylate polymer is the same. Hence, the Trommsdorff effect can be inhibited and stable polymerization is possible.

As a result, the concentration of the polymer in the polymer solution can be increased by adjusting the amount of the solvent to be used and increasing the monomer conversion, whereby productivity can be improved.

(3) Since the amount of the solvent to be used can be adjusted, the thermal decomposition resistance of the polymer can be prevented from deteriorating.

(4) Methanol has a relatively low boiling point, and so it easily volatilizes and scarcely dissolves the methyl methacrylate polymer at a low temperature of 100° C. or less. Therefore, methanol can be easily separated from the polymer solution, and a lower amount of remaining methanol in the obtained polymer is present, as compared with an case that the alkylbenzene or the like is used.

(5) Methanol is mass-produced as a solvent or a crude material on an industrial scale, and so it is inexpensive and available.

In view of the foregoing, the solution polymerization process of the methyl methacrylate monomer which uses methanol as the solvent can improve the productivity and simplify particularly a volatilization step and a volatile component collection step of a manufacturing plant, in contrast to a conventional method using a solvent such as an alkylbenzene. As a result, the solution polymerization process permits the methyl methacrylate polymer to be economically beneficially manufactured.

In the present invention, methanol is added as the solvent in an amount of 5 to 29% by weight, preferably 10 to 25% by weight based on the total weight of the monomer and methanol. That is to say, the amount of methanol is in the range of 5 to 29% by weight with respect to 71 to 95% by weight of the monomer component, preferably in the range of 10 to 25% by weight with respect to 75 to 90% by weight of the monomer component. When the amount of the monomer component is less than 71% by weight, the productivity is low, and the thermal decomposition resistance of the polymer noticeably deteriorates. Conversely, when it is more than 95% by weight, the viscosity of the polymer solution increases, and it is difficult to control the polymerization stably, as in the case of mass polymerization.

A polymerization temperature in the present invention is in the range of 90° to 180° C., preferably 100° to 170° C., more preferably 130° to 170° C. When the polymerization temperature is less than 90° C., the solubility of the polymer deteriorates, so that the concentration of the polymer increases and the phase separation of the polymer occurs to form a slurry.

On the other hand, if the polymerization temperature is more than 180° C., an operation pressure increases, and so the manufacturing cost of a reactor rises, which is inconvenient from an economical viewpoint. In addition, the formation of oligomers increases, which easily causes the coloring of the polymer, so that the quality of the polymer deteriorates.

In the process of the present invention, a monomer conversion (a polymerization ratio) is in the range of 40 to 90 mol %, preferably 60 to 90 mol %, more preferably 65 to 90 mol %. If the monomer conversion is less than 40 mol %, the load of the removal and the collection reuse step of the volatile components disadvantageously increases. Furthermore, if the monomer conversion is more than 90 mol %, viscosity increases, so that it is difficult to achieve stable polymerization.

No particular restriction is put on a radical polymerization initiator which can be used in the present invention, so long as it decomposes at the polymerization temperature to generate an active radical. Examples of the radical polymerization initiator include organic peroxides such as isobutyl peroxide, di-tert-butyl peroxide, di-tertamyl peroxide, acetyl peroxide, dicumyl peroxide, benzoyl peroxide, lauroyl peroxide, 3,5,5-trimethylhexanoyl peroxide, tert-butyl peroxyisobutyrate, tert-butyl peroxybenzoate, tert-butyl peroxydineodecanoate, tert-butyl peroxypivalate, tert-butyl peroxy(2-ethylhexanoate), di-isopropyl peroxydicarbonate, tert-butyl peroxyisopropylcarbonate, tert-hexyl peroxyisopropylcarbonate and di-2-ethylhexyl peroxydicarbonate, and azo compounds such as 2,2'-azobis(4-methoxy-2,4-dimethylvaleronitrile), 2,2'-azobis(2,4-dimethylvaleronitrile), (1-phenylethyl)azodiphenylmethane, 2,2'-azobisisobutyronitrile, dimethyl-2,2'-azobisisobutyrate, 2,2'-azobis(2-methylbutyronitrile), 1,1'-azobisisobutyrate and 1,1'-azobis(1-cyclohexanecarbonitrile).

As the chain transfer agent, mercaptans can be used which have usually been employed in the radical polymerization. Typical examples of the chain transfer agent include primary, secondary and tertiary mercaptans having an alkyl group or a substituted alkyl group, such as n-butyl mercaptan, isobutyl mercaptan, n-octyl mercaptan, n-dodecyl mercaptan, tert-butyl mercaptan and isooctyl thioglycollate. They may be used singly or in a combination two or more thereof.

In the process of the present invention, the polymerization reaction is caused to proceed in the uniform solution, while adjustment is made so as to meet the above-mentioned conditions, and in this case, no particular restriction is put on its procedure. For example, the monomer component, methanol, the polymerization initiator and the chain transfer agent are first blended to prepare a material solution, and this solution is fed to a polymerization reactor in which complete mixing can be carried out, and in this reactor, the polymerization is then carried out at a predetermined temperature. The polymerization reactor to be used is usually a stirring tank, but there may also be used a horizontal reactor or a tower type reactor equipped with a static mixer, a screw or a stirrer. Afterward, volatile components such as the solvent and the unreacted monomer are removed from the resulting polymerization solution to obtain the desired methyl methacrylate polymer. As the procedure for removing the volatile components, the polymerization solution is usually heated up to 200° to 300° C. by the use of a heat exchanger, and then flushed into a volatilizing tank in which pressure is reduced. In this case, the volatilization is done until the amount of the remaining volatile components has become 1% by weight or less, preferably 0.5% by weight or less.

Next, reference will be made to a suitable process of the present invention which is carried out in a one-stage complete stirring tank. That is to say, according to this suitable process (a process A), a material composition comprising the monomer, methanol as the solvent, the radical polymerization initiator and the chain transfer agent is prepared so that concentrations of the radical polymerization initiator and the chain transfer agent may be $1.0 \times 10^{-3}$ to 1.6 mol % and $1.0 \times 10^{-3}$ to 3.7 mol %, respectively, and in the one-stage complete stirring tank, the monomer is then continuously polymerized at a polymerization temperature of 90° to 180° C. for an average residence time which is 5 to 7,000 times as much as the half-value period of the polymerization initiator at the polymerization temperature, while the monomer conversion is maintained at 40 to 90%, thereby preparing the desired methyl methacrylate polymer.

Of the conditions in the process A, particularly preferable conditions meet the formulae (1) to (3):

$$7.0 \times 10^7 \leq \frac{C^2(\tau+\theta)e^{4529/T}}{I \cdot \theta^2} \leq 3.0 \times 10^9 \quad \text{Formula (1)}$$

$$100 \leq \frac{M}{D+E+F} \leq 40{,}000 \quad \text{Formula (2)}$$

$$4.0 \times 10^{-7} \leq \frac{I}{M} \cdot \frac{\theta}{\tau+\theta} \cdot (2.0 \times 10^{-3} \cdot R^2 - 8.5 \times 10^{-2} \cdot R + 1) \leq 1.0 \times 10^{-4} \quad \text{Formula (3)}$$

wherein C is the polymerization ratio (monomer conversion) (mol %); $\tau$ is the half-value period (minutes) of the radical polymerization initiator; $\theta$ is the average residence time (minutes); T is the polymerization temperature (absolute temperature); I is the concentration (mols/liter) of the radical polymerization initiator in the feed; M is the concentration (mols/liter) of the monomer in the feed; and R is a constant calculated from the polymerization ratio and the concentration of the acrylate in the monomer in the feed, and it can be defined by the formula $$R = m \cdot (3.7 \times 10^{-3} \cdot C + 0.63)$$

wherein m is the concentration (mol %) of the acrylate in the monomer in the feed; and
D, E and F can be defined by the formulae $$D = \frac{7.75 \times 10^3 e^{-3674/T} \cdot X}{100 + (7.75 \times 10^3 e^{-3674/T} - 1) \cdot C}$$

$$E = \frac{423 e^{-6021/T} \cdot S}{100 + (423 e^{-6021/T} - 1) \cdot C}$$

$$F = \frac{1.13 \times 10^{-4} e^{4529/T} \cdot C}{\theta \cdot (100 - C)^2}$$

wherein X is the concentration (mols/liter) of the chain transfer agent in the feed; and S is the concentration (mols/liter) of the fed solvent.

In the process A, as described above, in the material composition comprising the material monomer, methanol as the solvent, the radical polymerization initiator and the chain transfer agent, the concentration of the radical polymerization initiator is in the range of $1.0 \times 10^{-3}$ to 1.6 mol %, preferably $1.0 \times 10^{-3}$ to 1.0 mol %. If the concentration of the radical polymerization initiator is less than $1.0 \times 10^{-3}$ mol %, the industrially beneficial polymerization ratio, in other words, an industrially beneficial polymer concentration cannot be achieved. On the other hand, if it is more than 1.6 mol %, there is a fear that the polymer (the methyl methacrylate polymer) having an excellent thermal decomposition resistance cannot be obtained, and the transparency of the product polymer inconveniently deteriorates.

In the process A, the conditions are decided so that a value of the formula (1) may be in the range of $7.0 \times 10^7$ to $3.0 \times 10^9$ and so that a value of the formula (3) may be in the range of $4.0 \times 10^{-7}$ to $1.0 \times 10^{-4}$. If the value of the formula (1) is more than $3.0 \times 10^9$ and the value of the formula (3) is less than $4.0 \times 10^{-7}$, a industrially beneficial polymerization ratio cannot be attained. On the other hand, if the value of the formula (1) is less than $7.0 \times 10^{+7}$ and the value of the formula (3) is more than $1.0 \times 10^{-4}$, a high polymerization ratio can be attained, but a selectable molecular weight range is limited and a content ratio of the polymer having terminal double bonds in the produced polymer extremely increases. In addition, the use of a large amount of the polymerization initiator leads to a problem that the transparency of the product polymer deteriorates.

In this connection, the information regarding the half-value period and a decomposition rate of the radical polymerization initiator can be obtained from data such as "Organic Peroxides" Data Bulletin, the 13th edition published by Nippon Oils & Fats Co., Ltd., Technical Data of Atochem Yoshitomi Co., Ltd., and "Azo Polymerization Initiators" published from Wako Junyaku Co., Ltd.

Furthermore, in the process A, the concentration of the chain transfer agent in the above-mentioned material composition is in the range of $1.0 \times 10^{-3}$ to 3.7 mol % preferably $1.6 \times 10^{-2}$ to 0.6 mol %. If the concentration of the chain transfer agent is less than $1.0 \times 10^{-3}$ mol %, the content ratio of the polymer having the terminal double bonds in the produced polymer extremely increases. On the other hand, if it is more than 3.7 mol %, the molecular weight of the produced polymer decreases, so that sufficient mechanical properties cannot be obtained.

The above-mentioned conditions are decided so that the value of the formula (2) may be in the range of 100 to 40,000. If this value of the formula (2) is more than 40,000, the content ratio of the polymer having the terminal double bonds in the produced polymer extremely increases. On the other hand, if it is less than 100, the molecular weight of the produced polymer excessively decreases, so that the sufficient mechanical properties cannot be obtained.

The polymerization initiator and the chain transfer agent may be separately fed to the polymerization tank so as to have the desired concentrations with respect to the fed material composition, but they are preferably fed after dissolved in the monomer or the monomer mixture or the solvent.

The polymerization temperature in the process A is in the range of 90° to 180° C., preferably 100° to 170° C. If the polymerization temperature is too low, there is a fear that head-to-head bonds, which are so extremely weak in heat as to be cut at 200° C. or less, remain inconveniently in the produced polymer chain. On the other hand, if the polymerization temperature is too high, the production of oligomers is noticeable, so that the polymer tends to be colored.

In this process A, the average residence time is set so as to be 5 to 7,000 times as much as the half-value period of the polymerization initiator at the polymerization temperature. If the average residence time is less than 5 times as much as the half-value period of the polymerization initiator, a large amount of the polymerization initiator is required, though the polymerization ratio is low, and so the transparency of the product polymer is impaired. On the other hand, if it is more than 7,000 times, an excessively large polymerization tank is required, which is industrially disadvantageous.

In the process A, the polymerization is continuously carried out, while the polymerization ratio is maintained at 40 to 90%, preferably 40 to 70%. If the polymerization ratio is less than 40%, the yield of the polymer per unit time is low, which is industrially disadvantageous. On the other hand, if it is more than 90%, the content ratio of the polymer having terminal double bonds in the produced polymer extremely increases, so that the thermal decomposition resistance of the produced polymer noticeably deteriorates.

In order to prepare the polymer (the methyl methacrylate polymer) having an excellent thermal decomposition resistance by the process A, the above-mentioned conditions are selected, but it is more preferable to remove oxygen from the reaction system until an oxygen content has become 1 ppm or less.

Next, another preferable procedure of the present invention is the serially connected two-stage tank for complete stirring will be described. That is to say, according to this preferable procedure (the process B), the above-mentioned material composition is prepared so that concentrations of the radical polymerization initiator and the chain transfer agent may be $5.0 \times 10^{-4}$ to 1.2 mol % and $1.0 \times 10^{-3}$ to 1.0 mol %, respectively, and are in the serially connected two-stage tank for complete stirring. The above-mentioned monomer is then continuously polymerized at a first tank polymerization temperature of 90° to 170° C. and at a second tank polymerization temperature of 130° to 180° C. for an average residence time which is 5 to 7,000 times as much as the half-value period of the polymerization initiator at the polymerization temperatures, while the monomer conversion in the second tank is maintained at 70 to 90%, to prepare the desired methyl methacrylate polymer.

Of the conditions in the process B, particularly preferable conditions meet the formulae (4) to (6):

$$7.0 \times 10^7 \leq \frac{(C_2 - C_1)^2 \cdot (\tau_1 + \theta_1) \cdot (\tau_2 + \theta_2) e^{4529/T}}{I \cdot \tau_1 \cdot \theta_2^2} \leq 1.0 \times 10^{10} \quad \text{Formula (4)}$$

$$100 \leq \frac{M}{D' + E' + F'} \leq 40{,}000 \quad \text{Formula (5)}$$

$$4.0 \times 10^{-7} \leq \frac{I}{M} \cdot \frac{\theta_1}{\tau_1 + \theta_1} \cdot (2.0 \times 10^{-3} \cdot R_1^2 - 8.5 \times 10^{-2} \cdot R_1 + 1) \leq 1.0 \times 10^{-4} \quad \text{Formula (6)}$$

wherein $C_i$ (i=1 or 2) is the polymerization ratio of an i-th tank (monomer conversion) (mol %); $\tau_i$ is the half-value period (minutes) of the radical polymerization initiator in the i-th tank; $\theta_i$ is the average residence time (minutes) in the i-th tank; T is the polymerization temperature (absolute temperature) in the first tank; I is the concentration (mols/liter) of the radical polymerization initiator in the feed; M is the concentration (mols/liter) of the monomer in the feed; and $R_1$ is a constant calculated from the polymerization ratio and the concentration of the acrylate in the monomer in the feed in the first tank, and it can be defined by the formula $$R_1 = m \cdot (3.7 \times 10^{-3} \cdot C_1 + 0.63)$$

wherein m is the concentration (mol %) of the acrylate in the monomer in the feed; and
D', E' and F' can be defined by the formulae $$D' = \frac{7.75 \times 10^3 e^{-3674/T} \cdot X}{100 + (7.75 \times 10^3 e^{-3674/T} - 1) \cdot C_1}$$

$$E' = \frac{423 e^{-6021/T} \cdot S}{100 + (423 e^{-6021/T} - 1) \cdot C_1}$$

$$F' = \frac{1.13 \times 10^{-4} e^{4529/T} \cdot C_1}{\theta_1 \cdot (100 - C_1)^2}$$

wherein X is the concentration (mols/liter) of the chain transfer agent in the feed; and S is the concentration (mols/liter) of the solvent in the feed.

In the process B, the concentration of the radical polymerization initiator in the material composition is in the range of $5.0 \times 10^{-4}$ to 1.2 mol %, preferably $5.0 \times 10^{-4}$ to 1.0 mol %.

In the process B, the conditions are decided so that a value of the formula (4) may be in the range of $7.0 \times 10^7$ to $1.0 \times 10^{10}$ and so that a value of the formula (6) may be in the range of $4.0 \times 10^{-7}$ to $1.0 \times 10^{-4}$. If the value of the formula (4) is more than $1.0 \times 10^{10}$ and the value of the formula (6) is less than $4.0 \times 10^{-7}$, the industrially beneficial polymerization ratio cannot be attained. Moreover, if the concentration of the radical polymerization initiator is less than $5.0 \times 10^{-4}$, the similar results are obtained.

On the other hand, if the value of the formula (4) is less than $7.0 \times 10^7$ and the value of the formula (6) is more than $10 \times 10^{-4}$, the high polymerization ratio can be attained, but the desirable range of a molecular weight is limited and the content ratio of the polymer having the terminal double bonds in the produced polymer extremely increases. In addition, the use of a large amount of the polymerization initiator leads to a problem that the transparency of the product polymer deteriorates. Also in the case that the concentration of the radical polymerization initiator is more than 1.2 mol %, the similar results are obtained.

In this connection, the information regarding the half-value period and the decomposition rate of the radical polymerization initiator can be obtained from the above-mentioned technical literature and data.

Furthermore, in the process B, the concentration of the chain transfer agent in the above-mentioned material composition is in the range of $1.0 \times 10^{-3}$ to 1.0 mol %, preferably $2.0 \times 10^{-2}$ to 0.6 mol %. If the concentration of the chain transfer agent is less than $1.0 \times 10^{-3}$ mol %, the content ratio of the polymer having the terminal double bonds in the produced polymer extremely increases. On the other hand, if it is more than 1.0 mol %, the molecular weight of the produced polymer decreases, so that sufficient mechanical properties cannot be obtained any more.

The above-mentioned conditions are decided so that the value of the formula (5) may be in the range of 100 to 40,000. If this value of the formula (5) is more than 40,000, the content ratio of the polymer having the terminal double bonds in the produced polymer extremely increases. On the other hand, if it is less than 100, the molecular weight of the produced polymer excessively decreases, so that the sufficient mechanical properties cannot be obtained.

The polymerization initiator and the chain transfer agent may be separately fed to the polymerization tank so as to have desired concentrations with respect to the fed material composition, but preferably, they are continuously fed after dissolved in the monomer or the monomer mixture or the solvent. Alternatively, the polymerization initiator and the chain transfer agent may be partially introduced to the second tank. They are preferably fed so that the molecular weights of the polymers produced in the first and second tanks may be as equal as possible.

The polymerization temperature in the process B is in the range of 90° to 170° C., preferably 100° to 170° C. in the first tank, and in the range of 130° to 180° C., preferably 130° to 170° C. in the second tank. The polymerization temperature in the first tank is not always required to correspond to that in the second tank. If the polymerization temperature in the first tank is less than 90° C., there is a fear that head-to-head bonds, which are so extremely weak in heat as to be cut at 200° C. or less, inconveniently remain in the produced polymer chain. On the other hand, if the polymerization temperature is more than 170° C., the production of oligomers is noticeable, so that the polymer tends to be colored.

In the second tank, if the polymerization temperature is less than 130° C., the viscosity of the reaction solution increases, so that sufficient stirring cannot be done any more.

In this process B, the average residence time is set so as to be 5 to 7,000 times as much as the half-value period of the polymerization initiator at the polymerization temperature, but the average residence time in the first tank is not always required to correspond to that in the second tank. If the average residence time is less than 5 times as much as the half-value period of the polymerization initiator, a large amount of the polymerization initiator is required to obtain the desired polymerization ratio, so that the transparency of the product polymer is impaired. On the other hand, if it is more than 7,000 times, the excessively large polymerization tank is required, which is industrially disadvantageous.

In the process B, the polymerization is continuously carried out, while the polymerization ratio is maintained at 70 to 90%, preferably 70 to 80%.

If the polymerization ratio in the second tank is less than 70%, the yield of the polymer per unit time is low, and merits of using the two tanks decrease. On the other hand, if the polymerization ratio in the second tank is more than 90%, the content ratio of the polymer having terminal double bonds in the produced polymer extremely increases, so that the thermal decomposition resistance of the produced polymer noticeably deteriorates.

In order to prepare the polymer (the methyl methacrylate polymer) having excellent thermal decomposition resistance by the process B, the above-mentioned conditions are selected, but it is more preferable to remove oxygen from the reaction system until an oxygen content has become 1 ppm or less.

Furthermore, reference will be made to still another preferable procedure of the present invention in a serially connected two-stage tank for complete stirring and a plug flow type reactor. That is to say, according to this preferable procedure (the process C), the above-mentioned material composition is prepared so that concentrations of the radical polymerization initiator and the chain transfer agent may be $1.0 \times 10^{-3}$ to 1.6 mol % and $1.0 \times 10^{-3}$ to 1.0 mol %, respectively. In the complete stirring tank as a serially connected two-stage first stage reactor and the plug flow type reactor as a second stage reactor, the above-mentioned monomer is then continuously polymerized at a polymerization temperature of 90° to 170° C. Polymerization is also carried out in the complete stirring tank as the first stage reactor at a polymerization temperature of 90° to 180° C. and in the plug flow type reactor as the second stage reactor for an average residence time which is 5 to 7,000 times as much as the half-value period of the polymerization initiator at the polymerization temperatures in the complete stirring tank and for a flow time which is 5 to 50 times as much as the half-value period of the polymerization initiator at the polymerization temperatures in the plug flow type reactor. The monomer conversion at the outlet of the plug flow type reactor is maintained at 70 to 90% to prepare the desired methyl methacrylate polymer.

Of the conditions in the process C, particularly preferable conditions meet the formulae (7) to (9):

$$7.0 \times 10^7 \leq \frac{C^2(\tau+\theta)e^{4529/T}}{I \cdot \theta^2} \leq 3.0 \times 10^9 \quad \text{Formula (7)}$$

$$100 \leq \frac{M}{D+E+F} \leq 40{,}000 \quad \text{Formula (8)}$$

$$4.0 \times 10^{-7} \leq \quad \text{Formula (9)}$$

$$\frac{I}{M} \cdot \frac{\theta}{\tau+\theta} \cdot (2.0 \times 10^{-3} \cdot R^2 - 8.5 \times 10^{-2} \cdot R + 1) \leq 1.0 \times 10^{-4}$$

wherein C is the polymerization ratio (monomer conversion) (mol %) in the first stage complete stirring tank; $\tau$ is the half-value period (minutes) of the radical polymerization initiator in the first stage complete stirring tank; $\theta$ is the average residence time (minutes) in the first stage complete stirring tank; T is the polymerization temperature (absolute temperature) in the first stage complete stirring tank; I is the concentration (mols/liter) of the radical polymerization initiator in the feed; M is the concentration (mols/liter) of the monomer in the feed; and R is a constant calculated from the polymerization ratio and the concentration of the acrylate in the monomer in the feed in the first stage complete stirring tank, and it can be defined by the formula $$R = m \cdot (3.7 \times 10^{-3} \cdot C + 0.63)$$

wherein m is the concentration (mol %) of the acrylate in the monomer in the feed; and
D, E and F can be defined by the formulae $$D = \frac{7.75 \times 10^3 e^{-3674/T} \cdot X}{100 + (7.75 \times 10^3 e^{-3674/T} - 1) \cdot C}$$

$$E = \frac{423 e^{-6021/T} \cdot S}{100 + (423 e^{-6021/T} - 1) \cdot C}$$

$$F = \frac{1.13 \times 10^{-4} e^{4529/T} \cdot C}{\theta \cdot (100 - C)^2}$$

wherein X is the concentration (mols/liter) of the chain transfer agent in the feed; and S is the concentration (mols/liter) of the fed solvent.

In the process C, the concentration of the radical polymerization initiator in the material composition is in the range of $1.0 \times 10^{-3}$ to 1.6 mol %, preferably $1.0 \times 10^{-3}$ to 1.2 mol %. If the concentration of the radical polymerization initiator is less than $1.0 \times 10^{-3}$ mol %, the polymerization ratio in the first stage complete stirring tank is low, so that the ratio of the polymer (the methyl methacrylate polymer) produced in the second stage plug flow type reactor increases and a molecular-weight distribution spreads inconveniently. On the other hand, if it is more than 1.6 mol %, the selectable molecular weight range where the high polymerization ratio can be achieved is limited and the content ratio of the polymer having the terminal double bonds in the produced polymer extremely increases. In addition, the use of a large amount of the polymerization initiator leads to a problem that the transparency of the product polymer deteriorates.

In the process C, the above-mentioned conditions are decided so that a value of the formula (7) may be in the range of $7.0 \times 10^7$ to $3.0 \times 10^9$ and so that a value of the formula (9) may be in the range of $4.0 \times 10^{-7}$ to $1.0 \times 10^{-4}$. If the value of the formula (7) is more than $3.0 \times 10^9$ and the value of the formula (9) is less than $4.0 \times 10^{-7}$, the polymerization ratio in the first stage complete stirring tank is low, so that the ratio of the polymer produced in the second stage plug flow type reactor is high and the molecular-weight distribution spreads inconveniently. On the other hand, if the value of the formula (7) is less than $7.0 \times 10^7$ and the value of the formula (9) is more than $1.0 \times 10^{-4}$, the high polymerization ratio can be achieved, but the selectable molecular weight range where the high polymerization ratio can be achieved is limited and the content ratio of the polymer having the terminal double bonds in the produced polymer extremely increases. In addition, the use of a large amount of the polymerization initiator leads to the problem that the transparency of the product polymer deteriorates.

In this connection, the information regarding the half-value period and a decomposition rate of the radical polymerization initiator can be obtained from the above-mentioned technical literature and data.

Furthermore, in the process C, the concentration of the chain transfer agent in the above-mentioned material composition is in the range of $1.0 \times 10^{-3}$ to 1.0 mol %, preferably $1.6 \times 10^{-2}$ to 1.0 mol %. If the concentration of the chain transfer agent is less than $1.0 \times 10^{-3}$ mol %, the content ratio of the polymer having the terminal double bonds in the produced polymer extremely increases. On the other hand, if it is more than 1.0 mol %, the molecular weight of the produced polymer decreases, so that sufficient mechanical properties cannot be obtained any more.

The above-mentioned conditions are decided so that the value of the formula (8) may be in the range of 100 to 40,000. If this value of the formula (8) is more than 40,000, the content ratio of the polymer having the terminal double bonds in the produced polymer extremely increases. On the other hand, if it is less than 100, the molecular weight of the produced polymer excessively decreases, so that the sufficient mechanical properties cannot be obtained any more.

The polymerization initiator and the chain transfer agent may be separately fed to the polymerization tank so as to have the desired concentrations with respect to the fed material composition, but they are preferably fed after dissolved in the monomer or the monomer mixture or the solvent.

Alternatively, the polymerization initiator and the chain transfer agent may be partially introduced to the inlet and/or a certain middle position of the second stage plug flow type reactor.

The polymerization temperature in the process C is in the range of 90° to 180° C., preferably 100° to 170° C. in the first stage complete stirring tank, and in the range of 90° to 180° C., preferably 100° to 170° C. in the second plug flow type reactor. The polymerization temperature in the first stage tank is not always required to correspond to that in the second stage tank. If the polymerization temperature is less than 90° C., there is a fear that head-to-head bonds, which are so extremely weak in heat as to be cut at 200° C. or less, inconveniently remain in the produced polymer chain. On the other hand, if the polymerization temperature is more than 180° C., the production of oligomers is noticeable, so that the polymer tends to be colored.

In this process C, the average residence time in the first stage complete stirring tank is set so as to be 5 to 7,000 times as much as the half-value period of the polymerization initiator at the polymerization temperature. If the average residence time is less than 5 times as much as the half-value period of the polymerization initiator, a large amount of the polymerization initiator is required to obtain the desired polymerization ratio, so that the transparency of the product polymer is impaired. On the other hand, if it is more than 7,000 times, the excessively large polymerization tank is required, which is industrially disadvantageous. The flow time in the second stage plug flow type reactor is set so as to be 5 to 50 times as much as the half-value period of the polymerization initiator at the polymerization temperature. If the flow time is less than 5 times as much as the half-value period of the polymerization initiator, the polymerization ratio cannot be heightened. On the other hand, if it is more than 50 times, the excessively large plug flow type reactor is required.

In this process C, the polymerization is continuously carried out so that the polymerization ratio may be 70 to 90% at the outlet of the second stage plug flow type reactor. If the polymerization ratio at the outlet of the second stage plug flow type reactor is less than 70%, the yield of the polymer per unit time is low, and merits of using the two tanks decrease. On the other hand, if the polymerization ratio in the second stage reactor is more than 90%, a reaction ratio is low, and thus an extremely large reactor, a high polymerization temperature or a high concentration of the initiator is required, which is impractical.

In order to prepare the polymer (the methyl methacrylate polymer) having the excellent thermal decomposition resistance by the process C, the above-mentioned conditions are selected, but it is more preferable to remove oxygen from the reaction system until an oxygen content has become 1 ppm or less.

In the meantime, in this process C, the whole amount of the monomer or the monomer mixture which is the material is usually fed to the first stage complete stirring tank, but a part of the material can be introduced to the inlet and/or a certain middle position of the second stage plug flow type reactor. In this case, the composition of the monomer mixture fed to the first stage complete stirring tank is not always required to correspond to that of the monomer mixture fed to the second stage plug flow type reactor. The feed of the material should be carried out so that an acrylate unit concentration in the polymer which flows out from the second stage plug flow type reactor may be a desired concentration. In the case that the side-feed is done, the amount of the material for side-feed is preferably in the range of 1/50 to 1/5 of the main feed.

According to the process of the present invention, a Trommsdorff effect peculiar to the methyl methacrylate monomer can be inhibited, and a high-purity colorless methyl methacrylate polymer can be prepared with a high productivity through a stably controlled polymerization reaction.

In addition, according to the processes A, B and C which are preferable embodiments of the process of the present invention, a methyl methacrylate polymer having a higher quality can be obtained. Particularly, these processes permit the preparation of a methyl methacrylate polymer having excellent thermal decomposition resistance, i.e., excellent heat resistance immediately after a polymerization step, i.e., before a vacuum volatilization step or an extrusion step.

Next, the present invention will be described in more detail with reference to examples, but the scope of the present invention should not be limited by these examples at all. In the examples, "part" and "parts" mean "part by weight" and "parts by weight", respectively.

In Examples 1 to 12 and Comparative Example 1 to 7, physical properties of the polymers were measured by the following procedures.

(1) A thermal decomposition ratio was measured by thermogravimetric analysis. About 5 mg of a methyl methacrylate polymer was put on a platinum pan and then heated from room temperature to 500° C. at a temperature rise rate of 2° C./min in a nitrogen gas stream of 300 ml/min, and a weight loss ratio change was then measured by the use of a thermogravimetric analysis (TGA) device [model RTG 220 type, made by Seiko Instruments Inc.]. The thermal decomposition ratio was assumed to be a weight loss ratio at an inflection point of the peak of a depolymerization type zipper decomposition and the peak of a random decomposition on a DTG curve. This inflection point lies substantially at 300° C. under TG conditions.

(2) A polymerization ratio was determined by measuring the concentration of an unreacted monomer in a reaction solution which flows out from a polymerization tank by the use of a GC-380 type gas chromatography made by GL Science Co., Ltd.

(3) The molecular weight of the polymer was measured through a gel permeation chromatography (model 8010 type, made by Toso Co., Ltd.).

(4) The total light transmission of the polymer was measured in accordance with a transmission method prescribed in ASTM D1003 by the use of a model Z-Sensor Σ80 NDH made by Nippon Denshoku Kogyo Co., Ltd.

EXAMPLE 1

After the mixing of 88 parts of methyl methacrylate, 4 parts of methyl acrylate, 8 parts of methanol, 0.032 part ($2 \times 10^{-3}$ mol/l) of di-tert-butyl peroxide and 0.21 part ($10 \times 10^{-3}$ mol/l) of n-dodecyl mercaptan, nitrogen was blown into the mixture to remove oxygen dissolved therein, thereby preparing a material solution. Next, 5 kg of this material solution was placed in a 6-liter polymerization tank equipped with a jacket for circulating a heating medium therethrough and a helical ribbon stirring blade, and this tank was sealed up. The material solution was then heated up to 150° C., while sufficiently stirred to maintain a uniform mixing state, whereby polymerization was carried out until a monomer conversion and a polymer concentration had reached 75% and 69%, respectively. Afterward, the material solution was continuously fed to the polymerization tank in a ratio of 1 kg/hr.

A polymerization temperature was kept at 150° C. for an average residence time of 5 hours, and at this time, the viscosity of the polymerization solution, the monomer conversion and the polymer concentration were stably maintained at 45 Pa.sec, 75% and 69%, respectively. Next, this polymerization solution was drawn at a flow rate of 1 kg/hr, heated up to 250° C., and then flushed into a volatilizing tank under reduced pressure. The thus devolatilized polymer (the polymer from which the solvent and the monomer were removed) was drawn in a melting state through the bottom of the volatilizing tank, taken out in a strand state by a die, cooled with water, and then pelleted by a pelletizer.

The thus obtained pellets contained 0.27% of methyl methacrylate, 0.01% of methyl acrylate and 0.01% of methanol as the remaining volatile components, and its appearance was good, i.e., it was colorless and transparent. Physical properties of this polymer were as follows:

Weight-average molecular weight (Mw): 109,000
Total light transmission: 93%

EXAMPLES 2 to 12

Polymerization was carried out under various conditions by the same procedure as in Example 1, followed by a similar volatilization treatment, to obtain polymer pellets. In every example, a polymerization reaction was stably controlled to obtain the high-quality polymer. Tables 1 and 2 show compositions of the respective material solutions, monomer conversions, polymer concentrations in polymerization solutions and viscosities of the polymerization solutions, and Tables 5 and 6 show remaining volatile components, weight-average molecular weights (Mw) and total light transmissions of polymer pellets obtained by the volatilization treatment.

COMPARATIVE EXAMPLE 1

By the use of the same device as in Example 1, 96 parts of methyl methacrylate was mixed with 4 parts of methyl acrylate, 0.016 part ($1 \times 10^{-3}$ mol/l) of di-tert-butyl peroxide and 0.28 part ($13 \times 10^{-3}$ mol/l) of n-dodecyl mercaptan, and nitrogen was then blown into the mixture to remove oxygen dissolved therein, thereby preparing a material solution. Next, 5 kg of this material solution was placed in a polymerization tank, and this tank was sealed up. The material solution was then heated up to 150° C., while sufficiently stirred to maintain a uniform mixing state, whereby polymerization was carried out until a monomer conversion and a polymer concentration had reached 69% and 69%, respectively. Afterward, the above-mentioned material solution was continuously fed to the polymerization tank in a ratio of 1 kg/hr, and a polymerization temperature was maintained at 150° C. for an average residence time of 5 hours. Polymerization conditions were the same as in Example 1, but 120 minutes after a continuous operation, the viscosity of the resulting polymerization solution rapidly rose to 1,000 Pa.sec or more, so that stirring was difficult and it was also impossible to draw the polymerization solution. Thus, the operation was inevitably stopped.

COMPARATIVE EXAMPLE 2

By the use of the same device as in Example 1, 88 parts of methyl methacrylate was mixed with 4 parts of methyl acrylate, 8 parts of toluene, 0.032 part ($2 \times 10^{-3}$ mol/l) of di-tert-butyl peroxide and 0.21 part ($10 \times 10^{-3}$ mol/l) of n-dodecyl mercaptan, and nitrogen was then blown into the mixture to remove oxygen dissolved therein, thereby preparing a material solution. Next, 5 kg of this material solution was placed in a polymerization tank, and this tank was sealed up. The material solution was then heated up to 150° C., while sufficiently stirred to maintain a uniform mixing state, whereby polymerization was carried out until a monomer conversion and a polymer concentration had reached 75% and 69%, respectively. Afterward, the above-mentioned material solution was continuously fed to the polymerization tank in a ratio of 1 kg/hr, and a polymerization temperature was maintained at 150° C. for an average residence time of 5 hours. Polymerization conditions were the same as in Example 4 in which a solvent concentration was equal, but 240 minutes after a continuous operation, the viscosity of the resulting polymerization solution rapidly rose to 1,000 Pa.sec or more, so that stirring was difficult and it was also impossible to draw the polymerization solution.

COMPARATIVE EXAMPLE 3

By the use of the same device as in Example 1, 88 parts of methyl methacrylate was mixed with 4 parts of methyl acrylate, 8 parts of benzene, 0.032 part ($2 \times 10^{-3}$ mol/l) of di-tert-butyl peroxide and 0.21 part ($10 \times 10^{-3}$ mol/l) of n-dodecyl mercaptan to prepare a material solution. Next, continuous solution polymerization was carried out under the same conditions as in Comparative Example 2, but 180 minutes after the continuous operation, the viscosity of the resulting polymerization solution rapidly rose to 1,000 Pa.sec or more as in Comparative Example 2, so that it was difficult to continue the polymerization.

COMPARATIVE EXAMPLE 4

By the use of the same device as in Example 1, 88 parts of methyl methacrylate was mixed with 4 parts of methyl acrylate, 8 parts of methyl isobutyrate, 0.032 part ($2 \times 10^{-3}$ mol/l) of di-tert-butyl peroxide and 0.21 part ($10 \times 10^{-3}$ mol/l) of n-dodecyl mercaptan to prepare a material solution. Next, continuous solution polymerization was carried out under the same conditions as in Comparative Example 2, but 200 minutes after the continuous operation, the viscosity of the resulting polymerization solution rapidly rose to 1,000 Pa.sec or more as in Comparative Example 2, so that it was difficult to continue the polymerization.

COMPARATIVE EXAMPLE 5

By the use of the same device as in Example 1, 93 parts of methyl methacrylate was mixed with 4 parts of methyl acrylate, 3 parts of methanol, 0.032 part ($2 \times 10^{-3}$ mol/l) of di-tert-butyl peroxide and 0.21 part ($10 \times 10^{-3}$ mol/l) of n-dodecyl mercaptan to prepare a material solution. Next, continuous solution polymerization was carried out under the same conditions as in Comparative Example 1, but 140 minutes after the continuous operation, the viscosity of the resulting polymerization solution rapidly rose to 100 Pa.sec or more, so that it was difficult to continue the polymerization.

COMPARATIVE EXAMPLE 6

By the use of the same device as in Example 1, 62 parts of methyl methacrylate was mixed with 3 parts of methyl acrylate, 35 parts of methanol and 0.005 part ($0.3 \times 10^{-3}$ mol/l) of 2,2'-azobisisobutyronitrile to prepare a material solution. Next, continuous solution polymerization was carried out under the same conditions as in Comparative Example 1 except that a polymerization temperature was 85° C., but after the start of the continuous operation, the resulting polymerization solution became hazy in a slurry state and a polymer was deposited in a pipe for drawing the same from a polymerization tank to clog the pipe, so that it was difficult to continue the polymerization.

COMPARATIVE EXAMPLE 7

By the use of the same device as in Example 1, 88 parts of methyl methacrylate was mixed with 4 parts of methyl acrylate, 8 parts of methanol, 0.008 part ($5 \times 10^{-4}$ mol/l) of di-tert-butyl peroxide and 0.63 part ($30 \times 10^{-3}$ mol/l) of n-dodecyl mercaptan to prepare a material solution. Next, a polymerization temperature was maintained at 210° C. for an average residence time of 5 hours, and at this time, the viscosity of the resulting polymerization solution, a monomer conversion and a polymer concentration were stably maintained at 5 Pa.sec, 76% and 70%, respectively. Next, this polymerization solution was drawn at a flow rate of 1 kg/hr, heated up to 250° C., and then flushed into a volatilizing tank under reduced pressure. The thus devolatilized polymer was drawn in a melting state through the bottom of the volatilizing tank, taken out in a strand state by a die, cooled with water, and then pelleted by a pelletizer. The thus obtained pellets contained 0.27% of methyl methacrylate, 0.01% of methyl acrylate and 0.01% of methanol as remaining volatile components, and its appearance was colored light yellow. Physical properties of this polymer were as follows:

Weight-average molecular weight (Mw): 85,800

Total light transmission: 89%

The results of Comparative Example 1 to 7 are shown together in Tables 3 and 4.

TABLE 1

|  | Example 1 | Example 2 | Example 3 |
|---|---|---|---|
| Composition of Material Solution (parts) | | | |
| (1) Solvent | ME 8 | ME 18 | ME 28 |
| (2) MMA | 88 | 79 | 70 |
| (3) Comonomer | MA 4 | MA 3 | MA 2 |
| Conditions of Polymerization | | | |
| Polymerization initiator ($10^{-3}$ mol/l) | DBP 2 | DBP 2 | DBP 1 |
| Chain Transfer agent ($10^{-3}$ mol/l) | DDM 10 | DDM 5 | DDM 2 |
| Polymerization Temp. | 150 | 160 | 150 |
| Results | | | |
| Monomer conversion (%) | 75 | 78 | 68 |
| Polymer Conc. (wt %) | 69 | 64 | 49 |
| Viscosity of polymer (Pa · sec) | 45 | 7 | 1 |

|  | Example 4 | Example 5 | Example 6 |
|---|---|---|---|
| Composition of Material Solution (parts) | | | |
| (1) Solvent | ME 8 | ME 8 | ME 8 |
| (2) MMA | 79 | 88 | 88 |
| (3) Comonomer | MA 3 | MA 4 | MA 4 |
| Conditions of Polymerization | | | |
| Polymerization initiator ($10^{-3}$ mol/l) | DBP 1 | DAP 1 | DBP 1.8 |
| Chain Transfer agent ($10^{-3}$ mol/l) | DDM 6 | DDM 10 | DDM 10 |
| Polymerization Temp. | 150 | 150 | 150 |
| Results | | | |
| Monomer conversion (%) | 68 | 75 | 75 |
| Polymer Conc. (wt %) | 56 | 69 | 69 |
| Viscosity of polymer (Pa · sec) | 2 | 46 | 50 |

The abbreviations in the table have the following meanings (the same shall apply hereinafter).
MMA: Methyl methacrylate
MA: Methyl acrylate
DBP: Di-tert-butyl peroxide
DDM: n-dodecyl mercaptan
Note: The monomer conversion and the polymer concentration in the table are values measured immediately after the start of the continuous polymerization.
Note: The viscosity of the polymer in the table is a value measured immediately before the discontinuation of the continuous polymerization.
DAP in the table means di-tert-amyl peroxide (the same shall apply hereinafter).

TABLE 2

|  | Example 7 | Example 8 | Example 9 |
|---|---|---|---|
| Composition of Material Solution (parts) | | | |
| (1) Solvent | ME 8 | ME 8 | ME 8 |
| (2) MMA | 88 | 88 | 88 |
| (3) Comonomer | MA 4 | MA 4 | MA 4 |
| Conditions of Polymerization | | | |
| Polymerization initiator ($10^{-3}$ mol/l) | BPB 1.8 | BPE 4 | DBP 2 |
| Chain Transfer agent ($10^{-3}$ mol/l) | DDM 10 | DDM 10 | NOM 10 |
| Polymerization Temp. | 150 | 120 | 150 |
| Results | | | |
| Monomer conversion (%) | 75 | 75 | 75 |
| Polymer Conc. (wt %) | 69 | 69 | 69 |
| Viscosity of polymer (Pa · sec) | 48 | 110 | 47 |

|  | Example 10 | Example 11 | Example 12 |
|---|---|---|---|
| Composition of Material Solution (parts) | | | |
| (1) Solvent | ME 8 | ME 8 | ME 8 |
| (2) MMA | 88 | 88 | 88 |
| (3) Comonomer | MA 4 | EA 4 | BA 4 |
| Conditions of Polymerization | | | |
| Polymerization initiator ($10^{-3}$ mol/l) | DBP 2 | DBP 2 | DBP 1 |
| Chain Transfer agent ($10^{-3}$ mol/l) | TBM 10 | DDM 10 | DDM 10 |
| Polymerization Temp. | 150 | 150 | 150 |
| Results | | | |
| Monomer conversion (%) | 75 | 75 | 75 |
| Polymer Conc. (wt %) | 69 | 69 | 69 |
| Viscosity of polymer (Pa · sec) | 44 | 42 | 40 |

BPB in the table means tert-butyl peroxybenzoate (the same shall apply hereinafter).
The abbreviations in the table have the following meanings (the same shall apply hereinafter).
EA: Ethyl acrylate
BA: n-buty acrylate
TBM: Tert-butyl mercaptan

TABLE 3

|  | Comparative Example 1 | Comparative Example 2 |
|---|---|---|
| Composition of Material Solution (parts) | | |
| (1) Solvent | None | TOL 8 |
| (2) MMA | 96 | 88 |
| (3) Comonomer | MA 4 | MA 4 |
| Conditions of Polymerization | | |
| Polymerization initiator ($10^{-3}$ mol/l) | DBP 1 | DBP 2 |
| Chain Transfer agent ($10^{-3}$ mol/l) | DDM 13 | DDM 9 |
| Polymerization Temp. | 150 | 150 |
| Results | | |
| Monomer conversion (%) | 69 | 75 |
| Polymer Conc. (wt %) | 69 | 69 |
| Viscosity of polymer (Pa · sec) | >1000 | >1000 |

TABLE 3-continued

|  | Comparative Example 3 | Comparative Example 4 |
|---|---|---|
| Composition of Material Solution (parts) | | |
| (1) Solvent | BEN 8 | MIB 8 |
| (2) MMA | 88 | 88 |
| (3) Comonomer | MA 4 | MA 4 |
| Conditions of Polymerization | | |
| Polymerization initiator ($10^{-3}$ mol/l) | DBP 2 | DBP 2 |
| Chain Transfer agent ($10^{-3}$ mol/l) | DDM 9 | DDM 9 |
| Polymerization Temp. | 150 | 150 |
| Results | | |
| Monomer conversion (%) | 75 | 75 |
| Polymer Conc. (wt %) | 69 | 69 |
| Viscosity of polymer (Pa · sec) | >1000 | >1000 |

TOL in the table means toluene (the same shall apply hereinafter).
The abbreviations in the table have the following meanings (the same shall apply hereinafter).
BEN: Benzene
MIB: Methyl isobutyrate

TABLE 4

|  | Comparative Example 5 | Comparative Example 6 | Comparative Example 7 |
|---|---|---|---|
| Composition of Material Solution (parts) | | | |
| (1) Solvent | ME 3 | ME 35 | ME 8 |
| (2) MMA | 93 | 62 | 88 |
| (3) Comonomer | MA 4 | MA 3 | MA 4 |
| Conditions of Polymerization | | | |
| Polymerization initiator ($10^{-3}$ mol/l) | DBP 1 | AIBN 0.3 | DBP 0.5 |
| Chain Transfer agent ($10^{-3}$ mol/l) | DDM 5 | — | DDM 30 |
| Polymerization Temp. | 150 | 85 | 210 |
| Results | | | |
| Monomer conversion (%) | 68 | 30 | 76 |
| Polymer Conc. (wt %) | 66 | 19 | 70 |
| Viscosity of polymer (Pa · sec) | >100 | Production of slurry | 5 |

AIBN in the table means 2,2'-azobisisobutyronitrile.

TABLE 5

|  | Example 1 | Example 2 | Example 3 |
|---|---|---|---|
| Weight-average molecular weight (×100) | 109 | 101 | 105 |
| Total light transmission (%) | 93 | 93 | 93 |
| Remaining volatile components in pellets (%) | | | |
| (1) MMA | 0.27 | 0.29 | 0.35 |
| (2) Comonomer | MA 0.01 | MA 0.02 | MA 0.02 |
| (3) Solvent | ME 0.01 | ME 0.01 | ME 0.03 |

TABLE 5-continued

|  | Example 4 | Example 5 | Example 6 |
|---|---|---|---|
| Weight-average molecular weight (×100) | 108 | 106 | 110 |
| Total light transmission (%) | 93 | 93 | 93 |
| Remaining volatile components in pellets (%) |  |  |  |
| (1) MMA | 0.33 | 0.32 | 0.31 |
| (2) Comonomer | MA 0.02 | MA 0.01 | MA 0.01 |
| (3) Solvent | ND | ME 0.01 | ME 0.01 |

ND in the table means the limit (0.01%) of detection or less.

TABLE 6

|  | Example 7 | Example 8 | Example 9 |
|---|---|---|---|
| Weight-average molecular weight (×$10^3$) | 108 | 105 | 104 |
| Total light transmission (%) | 93 | 93 | 93 |
| Remaining volatile components in pellets (%) |  |  |  |
| (1) MMA | 0.30 | 0.34 | 0.32 |
| (2) Comonomer | MA 0.01 | MA 0.01 | MA 0.01 |
| (3) Solvent | ME 0.01 | ME 0.01 | ME 0.01 |

|  | Example 10 | Example 11 | Example 12 |
|---|---|---|---|
| Weight-average molecular weight (×$10^3$) | 105 | 107 | 103 |
| Total light transmission (%) | 93 | 93 | 93 |
| Remaining volatile components in pellets (%) |  |  |  |
| (1) MMA | 0.32 | 0.32 | 0.32 |
| (2) Comonomer | MA 0.01 | EA 0.01 | BA 0.03 |
| (3) Solvent | ME 0.01 | ME 0.01 | ME 0.01 |

EXAMPLE 13 n-dodecyl mercaptan and 2,2'-azobisisobutyronitrile were blended with a mixture of 88.3 parts (8.11 mols/l) of methyl methacrylate, 5.5 parts (0.69 mol/l) of methyl acrylate and 6.2 parts (1.79 mols/l) of methanol so that concentrations of n-dodecyl mercaptan and 2,2'-azobisisobutyronitrile might be 0.15 mol (0.016 mol/l) and 4.2×$10^{-3}$ mol % (0.45 mmol/l), respectively. Next, the thus obtained composition was continuously fed to a 10-liter complete stirring tank equipped with a helical ribbon blade at 1 kg/hr to carry out continuous polymerization.

The amount of the resulting reaction solution in the tank was 5 kg.

Accordingly, an average residence time was 5 hours.

A jacket temperature was adjusted so that a polymerization temperature might be 150° C. A polymerization ratio and a weight-average molecular weight of the produced polymer were stabilized at 61.5% and 85,000, respectively, and a stable operation could be done.

The reaction solution was drawn through the bottom of the tank by a gear pump so that the surface of the solution in the polymerization tank might be constant, and the drawn reaction solution was heated up to 250° C. by a heat exchanger and then continuously flushed into a volatilizing tank in which pressure was adjusted to 10 Torr. Afterward, the volatiles-free molten polymer was drawn through the bottom of the volatilizing tank in the form of a strand by the gear pump, and then cut into pellets. Furthermore, the polymer was also obtained by precipitating and purifying the reaction solution which flowed out from the polymerization tank.

Table 7 shows the concentrations of the used monomer, the acrylate in the monomer, methanol, the polymerization initiator and the chain transfer agent, the half-value period of the used polymerization initiator, a set average residence time, the polymerization temperature, a reached polymerization ratio, values obtained by substituting these results into the formulae (1) to (3), and the thermal decomposition ratio of the produced polymer measured by thermogravimetric analysis.

Figure 2:
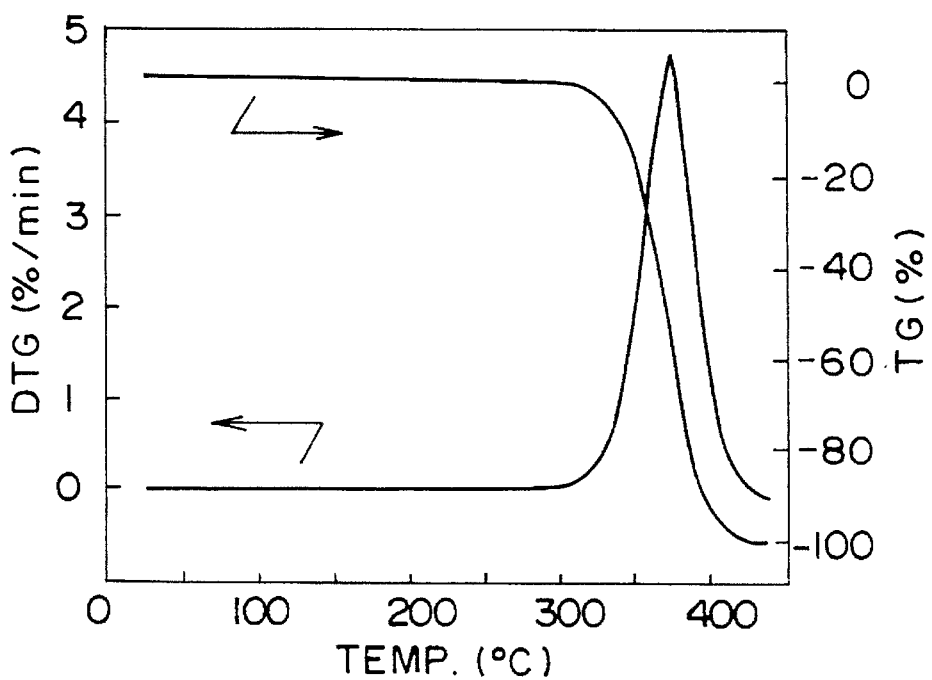
FIG. 2 shows the TG curve and the DTG curve of a polymer subjected to vacuum volatilization in Example 13.

For the reprecipitated and purified polymer which did not undergo heat history and the vacuum-devolatilized polymer which underwent the heat history, thermal decomposition resistance was inspected, and the results are shown in FIGS. 1 and 2, respectively. The thermal decomposition starting temperatures of both the polymers were 300° C., and a difference between TG and DTG curves was scarcely observed, which made it apparent that the polymers having the excellent heat decomposition resistance could be obtained irrespective of a polymerization step and a volatilization step. The vacuum-devolatilized polymer was molded at 260° C. into disks having a diameter of 150 mm and a thickness of 3 mm by the use of a 75 t injection molding machine made by Arburg GmBH, but the generation of silver streaks was not observed at all. The total light transmission of the molded articles was 93%, which meant that they were excellent in transparency.

TABLE 7

| Concentrations of material (mol/l) |  |
|---|---|
| Methyl methacrylate | 8.11 |
| Methyl acrylate | 0.69 |
| Methanol | 1.79 |
| n-dodecyl mercaptan | 0.016 |
| 2,2'-azobisisobutyronitrile | 4.5 × $10^{-4}$ |
| Half-value period τ of polymerization initiator (min) | 0.06 |
| Average residence time θ (min) | 300 |
| θ/τ | 4910 |
| Polymerization Temp. (°C.) | 150 |
| Polymerization ratio (mol %) | 61.5 |
| Value of formula (1) | 1.3 × $10^9$ |
| Value of formula (2) | 9.9 × $10^3$ |
| Value of formula (3) | 2.0 × $10^{-5}$ |
| Thermal decomposition ratio of polymer which did not undergo heat history (wt %) | 0.5 |

EXAMPLES 14 AND 15

Continuous polymerization was carried out in accordance with the same procedure as in Example 13 under various conditions shown in Table 8.

In every example, a polymerization reaction was stably controlled to obtain a polymer having excellent thermal decomposition resistance. Table 8 shows material compositions, the conditions of the polymerization, polymerization ratios and the properties of resins (weight-average molecular weights, ratios of comonomers in the polymers and thermal decomposition ratios).

TABLE 8

|  |  | Example 14 | Example 15 |
|---|---|---|---|
| Composition of material |  |  |  |
| MMA | (parts) | 82.9 | 71.0 |
|  | (mol/l) | 7.54 | 6.20 |
| Comonomer |  | MA | EA |
|  | (parts) | 3.8 | 6.8 |
|  | (mol/l) | 0.46 | 0.80 |
| Solvent |  | Methanol | Methanol |
|  | (parts) | 13.3 | 22.2 |
|  | (mol/l) | 3.81 | 6.25 |
| Polymerization initiator |  | AIBN | DAP |
|  | ($10^{-3}$ mol %) | 1.3 | 9.8 |
|  | ($10^{-3}$ mol/l) | 0.2 | 1.3 |
| Half-value period $\tau$ of polymerization initiator (min) |  | 0.06 | 5.26 |
| Chain transfer agent |  | DDM | DDM |
|  | (mol %) | 0.13 | 0.03 |
|  | ($10^{-3}$ mol/l) | 15.4 | 4.0 |
| Conditions of polymerization |  |  |  |
| Polymerization Temp. (°C.) |  | 150 | 160 |
| Average residence time $\theta$ (min) |  | 390 | 250 |
| $\theta/\tau$ |  | 6,373 | 48 |
| Polymerization ratio (mol %) |  | 52.0 | 70.7 |
| Properties of resin |  |  |  |
| Weight-average molecular weight (Mw) |  | 78,000 | 90,000 |
| Thermal decomposition ratio (wt %) |  | 0.6 | 1.4 |
| Properties of molded article |  |  |  |
| Generation of silver streaks |  | None | None |
| Generation of voids |  | None | None |
| Total light transmission (%) |  | 93 | 93 |

DAP in the table means di-tert-amyl peroxide (the same shall apply hereinafter).

COMPARATIVE EXAMPLE 8

A composition comprising 50.1 parts (4.29 mols/l) of methyl methacrylate, 1.8 parts (0.21 mol/l) of methyl acrylate, 48.1 parts (12.9 mols/l) of methanol, $5.7 \times 10^{-4}$ mol % (0.1 mmol/l) of n-dodecyl mercaptan and 0.017 mol % (3.0 mmols/l) of di-tert-amyl peroxide was continuously fed to the same polymerization tank as in Example 13 at 1.67 kg/hr, and continuous polymerization was then carried out at a polymerization temperature of 140° C. for an average residence time of 180 minutes ($\theta/\tau$=4.0). In this case, the polymerization ratio and the weight-average molecular weight of the produced polymer were stabilized at 67.7% and 73,000, respectively, and a stable operation could be done.

Table 9 shows the concentrations of the used monomer, the acrylate in the monomer, methanol, the polymerization initiator and the chain transfer agent, the half-value period of the used polymerization initiator, a set average residence time, the polymerization temperature, a reached polymerization ratio, values obtained by substituting these results into the formulae (1) to (3), and the thermal decomposition ratio of the produced polymer measured by thermogravimetric analysis.

Figure 3:
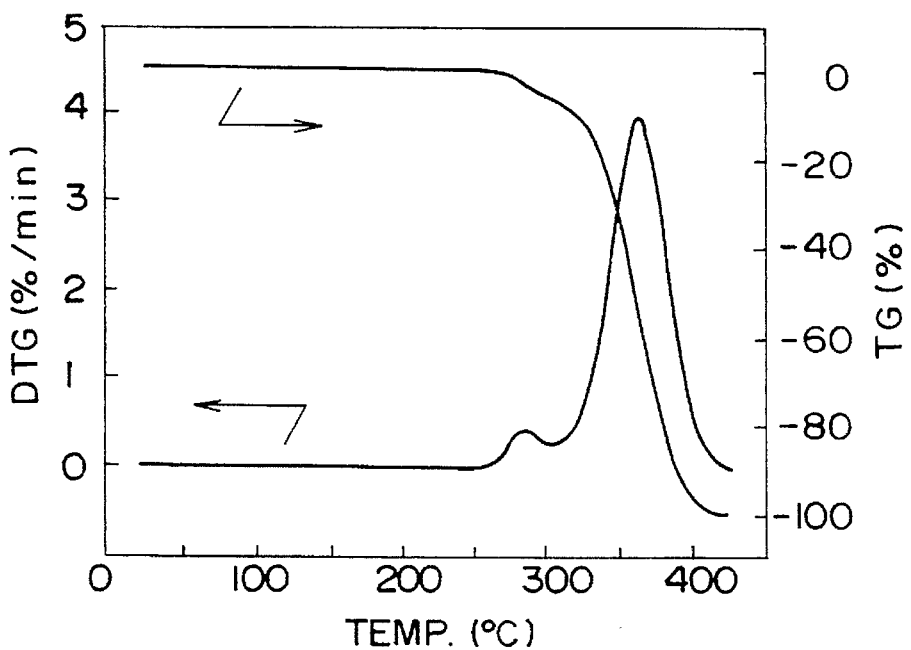
FIG. 3 shows the TG curve and the DTG curve of a polymer obtained by the precipitation and purification in Comparative Example 8.
Figure 4:
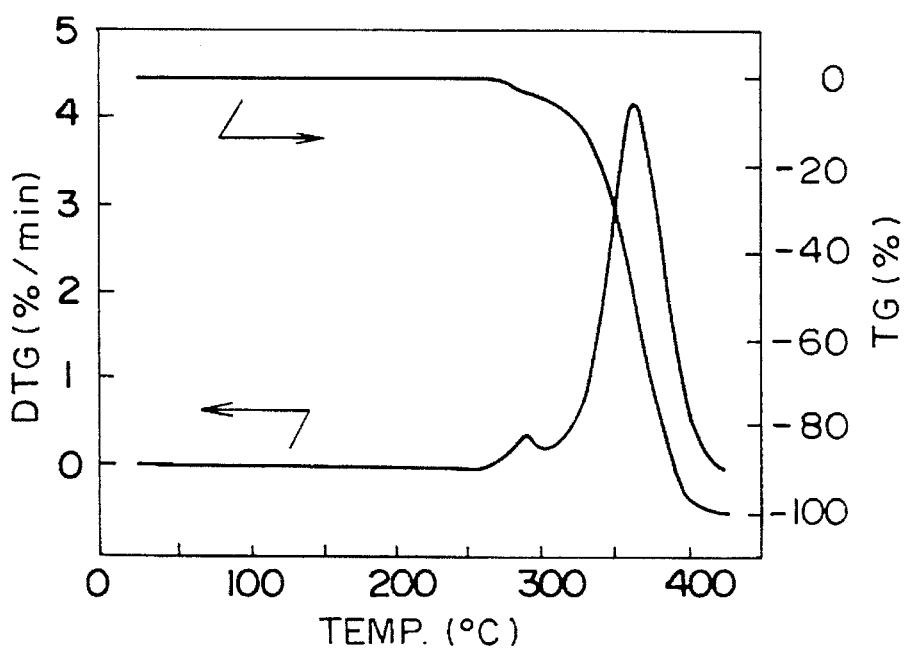
FIG. 4 shows the TG curve and the DTG curve of a polymer subjected to the vacuum volatilization in Comparative Example 8.

For the polymer (which did not undergo heat history) obtained by reprecipitating and purifying the resulting reaction solution which flowed out from the polymerization tank 15 hours after the start of the operation and the polymer (which underwent the heat history) subjected to vacuum volatilization at 250° C., thermal decomposition resistance was inspected as in Example 13, and the results are shown in FIGS. 3 and 4, respectively.

The thermal decomposition starting temperatures of the polymer which flowed out from the polymerization tank and the polymer subjected to the vacuum volatilization at 250° C. were both 250° C. The decomposition ratio of the polymer which flowed from the polymerization tank till 300° C. was 8.8.

On both of DTG curves, two peaks appeared at about 280° C. and 370° C., but in the polymer subjected to the vacuum volatilization, the peak at 280° C. slightly decreased.

It can be presumed that the polymer having terminal double bonds was partially decomposed at the time of the vacuum volatilization.

The vacuum-devolatilized polymer was molded at 260° C. into disks having a diameter of 150 mm and a thickness of 3 mm by the use of a 75 t injection molding machine made by Arburg GmBH, but silver streaks were generated, and the total light transmission of the molded articles was 89.5%.

TABLE 9

| Concentrations of material (mol/l) |  |
|---|---|
| Methyl methacrylate | 4.29 |
| Methyl acrylate | 0.21 |
| Methanol | 12.9 |
| n-dodecyl mercaptan | $1.0 \times 10^{-4}$ |
| Di-tert-amyl peroxide | 0.003 |
| Half-value period $\tau$ of polymerization initiator (min) | 44.9 |
| Average residence time $\theta$ (min) | 180 |
| Polymerization Temp. (°C.) | 140 |
| Polymerization ratio (mol %) | 67.7 |
| Value of formula (1) | $6.7 \times 10^8$ |
| Value of formula (2) | $1.9 \times 10^3$ |
| Value of formula (3) | $2.8 \times 10^{-4}$ |
| Thermal decomposition ratio of polymer which did not undergo heat history (wt %) | 9.0 |

COMPARATIVE EXAMPLE 9

A composition comprising 78.1 parts (7.18 mols/l) of methyl methacrylate, 2.58 parts (0.32 mol/l) of methyl acrylate, 19.2 parts (1.94 mols/l) of toluene, 0.01 mol % (1.0 mol/l) of n-dodecyl mercaptan and 0.04 mol % (4.0 mmols/l) of di-tert-butyl peroxide was continuously fed to a polymerization tank, and continuous polymerization was then carried out at a polymerization temperature of 150° C. for an average residence time of 300 minutes ($\theta/\tau$=9.3). In this case, the polymerization ratio and the weight-average molecular weight of the produced polymer were stabilized at 80.7% and 97,000, respectively, and an operation could be done.

For the polymer obtained by reprecipitating and purifying the resulting reaction solution which flowed out from the polymerization tank 15 hours after the start of the operation and the polymer subjected to vacuum volatilization at 270° C., a thermal decomposition resistance temperature was inspected, and in both the polymers, it was 250° C. The decomposition ratio of the polymer which flowed from the polymerization tank till 300° C. was 11.0%.

EXAMPLE 16

In order to carry out continuous polymerization in a serially connected two-stage tank for complete stirring, a 10-liter complete stirring tank having first and second tanks each equipped with a helical ribbon blade was used.

n-dodecyl mercaptan and di-tert-amyl peroxide were blended with a mixture of 88.4 parts of methyl methacrylate, 3.0 parts of methyl acrylate and 8.6 parts of methanol so that concentrations of n-dodecyl mercaptan and di-tert-amyl peroxide might be 0.11 mol % and 2.7 mmol %, respectively. Next, the thus obtained composition was continuously fed to the first tank at 1 kg/hr, and simultaneously drawn through the bottom of the tank by a gear pump and then introduced into the second tank. The amounts of the resulting reaction solution in the respective tanks were both adjusted to 5 kg, and the surface of the solution was kept up at a constant level by controlling a flow rate. In both the tanks, an average residence time was set to 180 minutes. A jacket temperature was adjusted so that a polymerization temperature might be 150° C. Therefore, the average residence time was 10.1 times as much as the half-value period of the polymerization initiator. Polymerization ratios in the first and second stage tanks were 47.1% and 71.0%, respectively, and the obtained polymer had an average molecular weight of 90,000.

Tables 10 to 11 show the concentrations of the used monomer, the acrylate in the monomer, methanol, the polymerization initiator and the chain transfer agent, the half-value period of the used polymerization initiator, a set average residence time, the polymerization temperature, a reached polymerization ratio, values obtained by substituting these results into the formulae (4) to (6), and the thermal decomposition ratio of the produced polymer measured by thermogravimetric analysis.

For the reprecipitated and purified polymer which did not undergo heat history and the vacuum-devolatilized polymer which underwent the heat history, thermal decomposition resistance was inspected, and as a result, the thermal decomposition starting temperatures of both the polymers were substantially 300° C. Moreover, a difference between TG and DTG curves was scarcely observed, which made it apparent that the polymers having the excellent heat decomposition resistance could be obtained irrespective of a polymerization step and a volatilization step. The vacuum-devolatilized polymer was molded at 260° C. into disks having a diameter of 150 mm and a thickness of 3 mm by the use of a 75 t injection molding machine made by Arburg GmBH, but the generation of silver streaks was not observed at all. The total light transmission of the molded articles was 93%, which meant that they were excellent in transparency.

EXAMPLE 17

Continuous polymerization was carried out in accordance with the same procedure as in Example 16 under various conditions shown in Tables 10 and 11. In this example, a polymerization reaction could be stably controlled to obtain a polymer having excellent thermal decomposition resistance. Tables 10 and 11 show a material composition, the conditions of the polymerization, a polymerization ratio and properties of a resin (weight-average molecular weight, the amount of a comohomer in the polymer, a composition ratio and a thermal decomposition ratio).

TABLE 10

|  |  | Example 16 | Example 17 |
|---|---|---|---|
| Composition of material | | | |
| (1) Composition of main feed to first tank | | | |
| MMA | (parts) | 88.4 | 85.0 |
| Comonomer | | MA | BA |
|  | (parts) | 3.0 | 4.9 |

TABLE 10-continued

|  |  | Example 16 | Example 17 |
|---|---|---|---|
| Solvent | | Methanol | Methanol |
|  | (parts) | 8.6 | 10.0 |
| Polymerization initiator | | DAP | DBP |
|  | ($10^{-3}$ mol %) | 3.2 | 3.6 |
| Chain transfer agent | | DDM | OM |
|  | (mol %) | 0.13 | 0.094 |
| (2) Composition of side-feed to second tank | | | |
| MMA | (parts) | 73.1 | 90.0 |
| Comonomer | (parts) | 26.9 | 10.0 |
| Polymerization initiator ($10^{-3}$ mol %) | | 102 | 21 |
| Chain transfer agent ($10^{-3}$ mol %) | | 280 | 300 |
| Main feed/side-feed (weight ratio) | | 33.4/1 | 13.9/1 |

The abbreviations in the table have the following meanings (the same shall apply hereinafter).
DBP: Di-t-butyl peroxide
OM: n-octyl mercaptan

TABLE 11

|  | Example 16 | Example 17 |
|---|---|---|
| Conditions of polymerization | | |
| (1) First tank | | |
| Polymerization Temp. (°C.) | 150 | 160 |
| Average residence time θ (min) | 180 | 180 |
| Half-value period τ of polymerization initiator (min) | 15.8 | 22.8 |
| Polymerization ratio in first tank (%) | 47.1 | 54.3 |
| (2) Second tank | | |
| Polymerization Temp. (°C.) | 150 | 160 |
| Average residence time θ (min) | 180 | 180 |
| Half-value period τ of polymerization initiator (min) | 15.8 | 22.8 |
| Polymerization ratio in second tank (%) | 71.0 | 74.1 |
| Properties of resin | | |
| Weight-average molecular weight (Mw) | 90,000 | 81,000 |
| Value of formula (4) | $5.7 \times 10^9$ | $3.2 \times 10^9$ |
| Value of formula (5) | 13,000 | 11,000 |
| Value of formula (6) | $2.9 \times 10^{-5}$ | $2.8 \times 10^{-5}$ |
| Thermal decomposition ratio (wt %) | 1.4 | 0.5 |
| Properties of molded article | | |
| Generation of silver streaks | None | None |
| Generation of voids | None | None |
| Total light transmission (%) | 93 | 93 |

COMPARATIVE EXAMPLE 10

A composition comprising 58.2 parts of methyl methacrylate, 2.0 parts of methyl acrylate, 39.8 parts of toluene, 0.032 mol % of n-dodecyl mercaptan and 0.020 mol % of di-tert-amyl peroxide was continuously fed to a first tank at 1.67 kg/hr, and another composition comprising 90.0 parts of methyl methacrylate, 10.0 parts of methyl acrylate, 0.012 mol % of n-dodecyl mercaptan and 0.019 mol % of di-tert-amyl peroxide was introduced to a second tank at 120 kg/hr. In both the tanks, continuous polymerization was carried out at a polymerization temperature of 140° C. for an average residence time of 180 minutes. Therefore, the average residence time was 3.4 times as much as the half-value period of the polymerization initiator. The operation was maintained at a polymerization ratio of 63.8% in the first stage tank and at a polymerization ratio of 82.2% in the second stage tank so that the weight-average molecular weight of the obtained polymer might be 86,000.

Table 12 shows the concentrations of the used monomer, the acrylate in the monomer, toluene, the polymerization initiator and the chain transfer agent, the half-value period of the used polymerization initiator, the set average residence time, the polymerization temperature, the reached polymerization ratio, values obtained by substituting these results into the formulae (4) to (6), and the thermal decomposition ratio of the produced polymer measured by thermogravimetric analysis.

Figure 5:
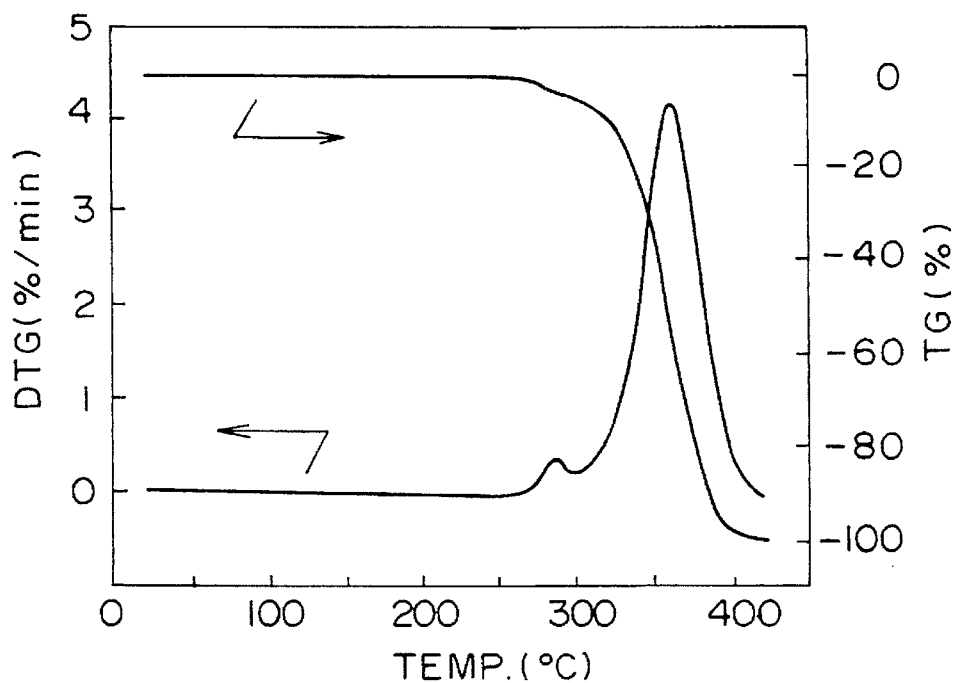
FIG. 5 shows the TG curve and the DTG curve of a polymer obtained by the precipitation and purification in Comparative Example 10.
Figure 6:
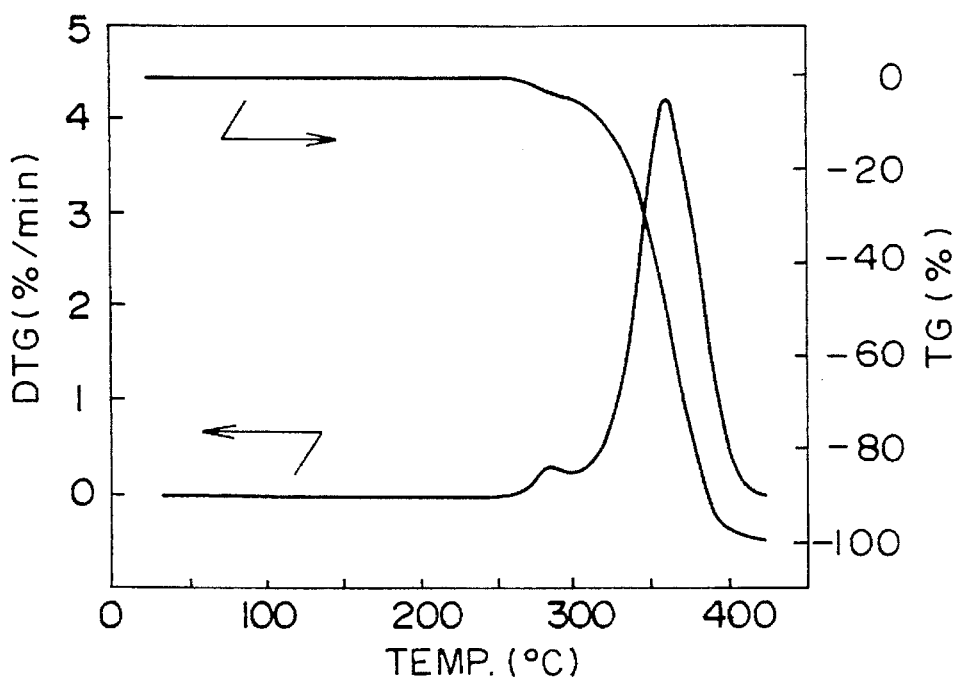
FIG. 6 shows the TG curve and the DTG curve of a polymer subjected to the vacuum volatilization in Comparative Example 10.

For the polymer (which did not undergo heat history) obtained by precipitating and purifying the resulting reaction solution which flowed out from the second tank 15 hours after the start of the operation and the polymer (which underwent the heat history) subjected to vacuum volatilization at 250° C., thermal decomposition resistance was inspected as in Example 16, and the results are shown in FIGS. 5 and 6, respectively. The thermal decomposition starting temperatures of the polymer which flowed out from the second tank and the polymer subjected to the vacuum volatilization at 250° C. were both 250° C. The decomposition ratio of the polymer which flowed from the second tank till 300° C. was 7.0%. On both of DTG curves, two peaks appeared at about 280° C. and 370° C., but in the polymer subjected to the vacuum volatilization, the peak at 280° C. slightly decreased. It can be presumed that the polymer having terminal double bonds was partially decomposed at the time of the vacuum volatilization.

The vacuum-devolatilized polymer was molded at 260° C. into disks having a diameter of 150 mm and a thickness of 3 mm by the use of a 75 t injection molding machine made by Arburg GmBH, but silver streaks were generated to make the molded articles hazy. The total light transmission of the molded articles was 89%.

TABLE 12

| Concentrations of Material | |
|---|---|
| Composition of main feed in first tank (mol/l) | |
| Methyl methacrylate | 5.29 |
| Methyl acrylate | 0.21 |
| Toluene | 3.93 |
| n-dodecyl mercaptan | 0.003 |
| Di-tert-amyl peroxide | 0.002 |
| Composition of side-feed in second tank (mol/l) | |
| Methyl methacrylate | 8.47 |
| Methyl acrylate | 1.10 |
| n-dodecyl mercaptan | 0.001 |
| Di-tert-amyl peroxide | 0.002 |
| Main feed/side-feed (weight ratio) | 14.0/1 |
| Conditions of polymerization | |
| First tank | |
| Polymerization Temp. (°C.) | 150 |
| Average residence time θ (min) | 300 |
| Polymerization ratio (mol %) | 74.0 |
| Second tank | |
| Polymerization Temp. (°C.) | 150 |
| Average residence time θ (min) | 300 |
| Polymerization ratio (mol %) | 85.0 |
| Value of formula (4) | $2.0 \times 10^8$ |
| Value of formula (5) | $2.9 \times 10^3$ |
| Value of formula (6) | $2.5 \times 10^{-4}$ |
| Thermal decomposition ratio of polymer which did not undergo heat history (%) | 7.0 |

COMPARATIVE EXAMPLE 11

A composition comprising 60.2 parts (5.44 mols/l) of methyl methacrylate, 0.6 part (0.06 mol/l) of methyl acrylate, 37.4 parts (10.24 mols/l) of methanol and 0.007 mol % (1.1 mmol/l) of 2,2'-azobisisobutyronitrile was continuously fed to a first tank at 1.67 kg/hr as in Example 16, and another composition comprising 95.0 parts (8.93 mol/l) of methyl methacrylate, 5.0 parts (0.55 mol/l) of methyl acrylate and 0.12 mol % (11.5 mmols/l) of 2,2'-azobisisobutyronitrile was introduced to a second tank at 120 kg/hr. In both the first and second tanks, continuous polymerization was carried out at a polymerization temperature of 130° C. for an average residence time of 180 minutes. Therefore, the average residence time was 479 times as much as the half-value period of the polymerization initiator. The operation was maintained at a polymerization ratio of 60.3% in the first stage tank and at a polymerization ratio of 82.7% in the second stage tank so that the weight-average molecular weight of the obtained polymer might be 79,000.

For the polymer (which did not undergo heat history) obtained by precipitating and purifying the resulting reaction solution which flowed out from the second tank 15 hours after the start of the operation and the polymer (which underwent the heat history) subjected to vacuum volatilization at 250° C., thermal decomposition resistance was inspected as in Example 16, and the thermal decomposition starting temperatures of both the polymers were 250° C. The decomposition ratio of the polymer which flowed from the second tank till 300° C. was 8.2%. On both of DTG curves, two peaks appeared at about 280° C. and 370° C., but in the polymer subjected to the vacuum volatilization, the peak at 280° C. slightly decreased. It can be presumed that the polymer having terminal double bonds was partially decomposed at the time of the vacuum volatilization at 250° C.

EXAMPLE 18

In order to carry out continuous polymerization by the use of a serially connected two-stage tank for complete stirring and a plug flow type reactor, a 10-liter complete stirring tank equipped with a helical ribbon blade and a static mixer having an inner diameter of ¾ inch were used in a first stage and a second stage, respectively.

A composition comprising 85.5 parts of methyl methacrylate, 5.5 parts of methyl acrylate, 8.9 parts of methanol, 0.11 mol % of n-dodecyl mercaptan and 2.3 mmol % of di-tert-amyl peroxide was continuously fed to the first tank at 1 kg/hr, and simultaneously drawn through the bottom of the tank by a gear pump and then introduced into the static mixer. The amount of the resulting reaction solution in the first tank was adjusted to 5 kg, and the surface of the solution was kept up at a constant level by controlling a flow rate. An average residence time was set to 180 minutes, and a flow time in the second stage was set to 120 minutes. A jacket temperature was adjusted so that a polymerization temperature might be 150° C.

Polymerization ratios in the first and second stages were 45.7% and 86.0%, respectively, and the obtained polymer had a weight-average molecular weight of 90,000.

On the other hand, the reaction solution was drawn through the bottom of the second stage static mixer by a gear pump, heated up to 250° C. by a heat exchanger, and then flushed into a volatilizing tank in which pressure was adjusted to 10 Torr. Afterward, the volatiles-free molten polymer was drawn through the bottom of the volatilizing tank in the form of a strand by the gear pump, and then cut into pellets. Furthermore, the polymer was also obtained by precipitating and purifying the reaction solution which flowed out from the second stage static mixer.

Tables 13 to 14 show the concentrations of the used monomer, the acrylate in the monomer, methanol, the polymerization initiator and the chain transfer agent, the half-value period of the used polymerization initiator, the set average residence time, the polymerization temperature, the reached polymerization ratio, values obtained by substituting these results into the formulae (7) to (9), and the thermal decomposition ratio of the produced polymer measured by thermogravimetric analysis.

For the reprecipitated and purified polymer which did not undergo heat history and the vacuum-devolatilized polymer which underwent the heat history, thermal decomposition resistance was inspected, and as a result, the thermal decomposition starting temperatures of both the polymers were substantially 300° C. Moreover, a difference between TG and DTG curves was scarcely observed, which made it apparent that the polymers having a excellent heat decomposition resistance could be obtained irrespective of a polymerization step and a volatilization step. The vacuum-devolatilized polymer was molded at 260° C. into disks having a diameter of 150 mm and a thickness of 3 mm by the use of a 75 t injection molding machine made by Arburg GmBH, but the generation of silver streaks was not observed at all. The total light transmission of the molded articles was 93%, which meant that they were excellent in transparency.

EXAMPLE 19

Continuous polymerization was carried out in accordance with the same procedure as in Example 18 under various conditions shown in Tables 13 and 14. In this example, a polymerization reaction could be stably controlled to obtain a polymer having excellent thermal decomposition resistance. Tables 13 and 14 show a material composition, the conditions of the polymerization, a polymerization ratio and properties of a resin (weight-average molecular weight, the amount of a comonomer in the polymer, a composition ratio and a thermal decomposition ratio).

TABLE 13

|  |  | Example 18 | Example 19 |
|---|---|---|---|
| Composition of material |
| (1) Composition of main feed to first tank |
| MMA | (parts) | 85.5 | 86.0 |
| Comonomer |  | MA | BA |
|  | (parts) | 5.5 | 3.9 |
| Solvent |  | Methanol | Methanol |
|  | (parts) | 10.4 | 10.0 |
| Polymerization initiator |  | DAP | DBP |
|  | ($10^{-3}$ mol %) | 2.3 | 3.6 |
| Chain transfer agent |  | OM | DDM |
|  | (mol %) | 0.11 | 0.094 |
| (2) Composition of side-feed to second stage plug flow type reactor |
| MMA | (parts) | 93.5 | 80.0 |
| Comonomer | (parts) | 6.5 | 20.0 |
| Polymerization initiator |  | DAP | DBP |
|  | ($10^{-3}$ mol %) | 105 | 103 |
| Chain transfer agent |  | 105 | 206 |
|  | ($10^{-3}$ mol %) |  |  |
| Main feed/side-feed (weight ratio) |  | 10.0/1 | 20.0/1 |

TABLE 14

|  | Example 18 | Example 19 |
|---|---|---|
| Conditions of polymerization |
| (1) First tank |
| Polymerization Temp. (°C.) | 150 | 160 |
| Average residence time θ (min) | 180 | 300 |
| Half-value period τ of polymerization initiator (min) | 15.8 | 11.6 |
| Polymerization ratio in first tank (%) | 45.7 | 56.6 |
| (2) Second stage plug flow type reactor |
| Polymerization Temp. (°C.) | 150 | 150 |
| Flow time (min) | 120 | 120 |
| Half-value period τ of polymerization initiator (min) | 15.8 | 11.6 |
| Polymerization ratio at outlet of second stage static mixer (mol %) | 86.0 | 87.1 |
| Properties of resin |
| Weight-average molecular weight (Mw) | 90,000 | 93,000 |
| Value of formula (7) | $2.1 \times 10^9$ | $1.1 \times 10^9$ |
| Value of formula (8) | $1.6 \times 10^4$ | $1.2 \times 10^4$ |
| Value of formula (9) | $1.5 \times 10^{-5}$ | $2.7 \times 10^{-5}$ |
| Thermal decomposition ratio (wt %) | 1.4 | 0.9 |
| Properties of molded article |
| Generation of silver streaks | None | None |
| Generation of voids | None | None |
| Total light transmission (%) | 93 | 93 |

COMPARATIVE EXAMPLE 12

A composition comprising 57.5 parts (5.23 mols/l) of methyl methacrylate, 2.6 parts (0.27 mol/l) of methyl acrylate, 39.9 parts (3.94 mols/l) of toluene, 0.021 mol % (2.0 mmols/l) of di-tert-amyl peroxide and 0.021 mol % (2.0 mmols/l) of n-dodecyl mercaptan was continuously fed to a first tank at 1.67 kg/hr, and then introduced into a second reactor static mixer. Furthermore, another composition comprising 80.0 parts (7.53 mols/l) of methyl methacrylate, 20.0 parts (2.19 mols/l) of methyl acrylate, 0.051 mol % (5.0 mmols/l) of di-tert-amyl peroxide and 0.051 mol % (5.0 mmols/l) of n-dodecyl mercaptan was introduced to the inlet of the static mixer at 167 g/hr. In both the reactors, polymerization was carried out at a polymerization temperature of 140° C. for an average residence time of 3 hours and a flow time of 2 hours. Therefore, the average residence time was 3.4 times as much as the half-value period of the polymerization initiator and 2.3 times as much as the flow time.

As a result, a polymerization ratio in the first stage is 58.3%, a polymerization ratio at the outlet of the second reactor static mixer was 88.2%, and the weight-average molecular weight of the obtained polymer was 79,000.

Table 15 shows the concentrations of the used monomer, the acrylate in the monomer, toluene, the polymerization initiator and the chain transfer agent, the half-value period of the used polymerization initiator, the set average residence time, the polymerization temperature, the reached polymerization ratio, values obtained by substituting these results into the formulae (7) to (9), and the thermal decomposition ratio of the produced polymer measured by thermogravimetric analysis.

Figure 7:
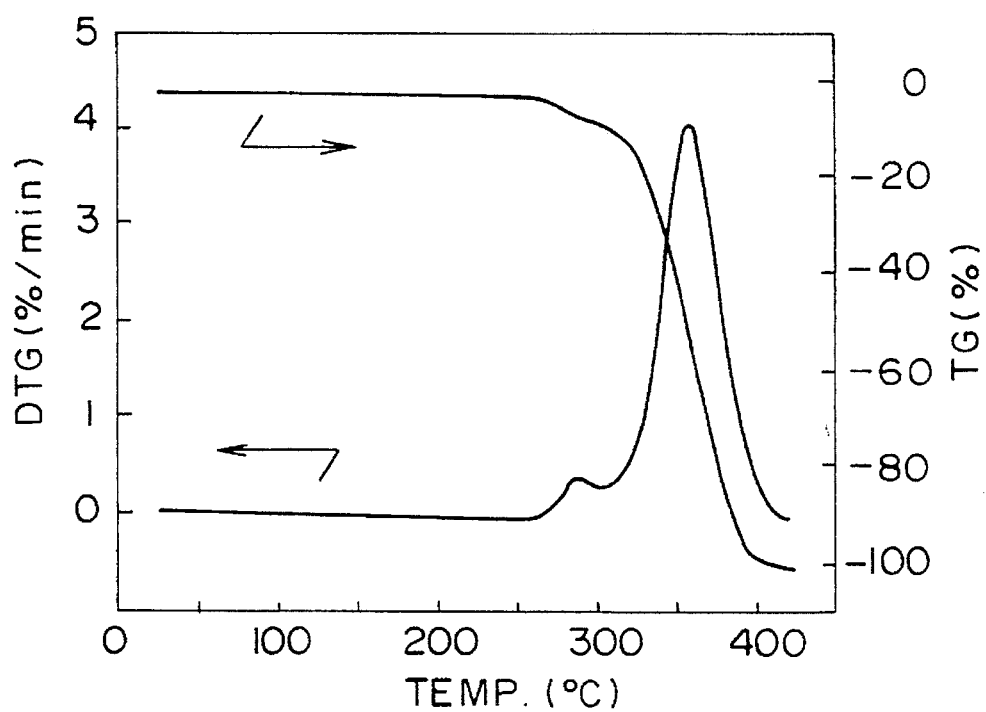
FIG. 7 shows the TG curve and the DTG curve of a polymer obtained by the precipitation and purification in Comparative Example 12.
Figure 8:
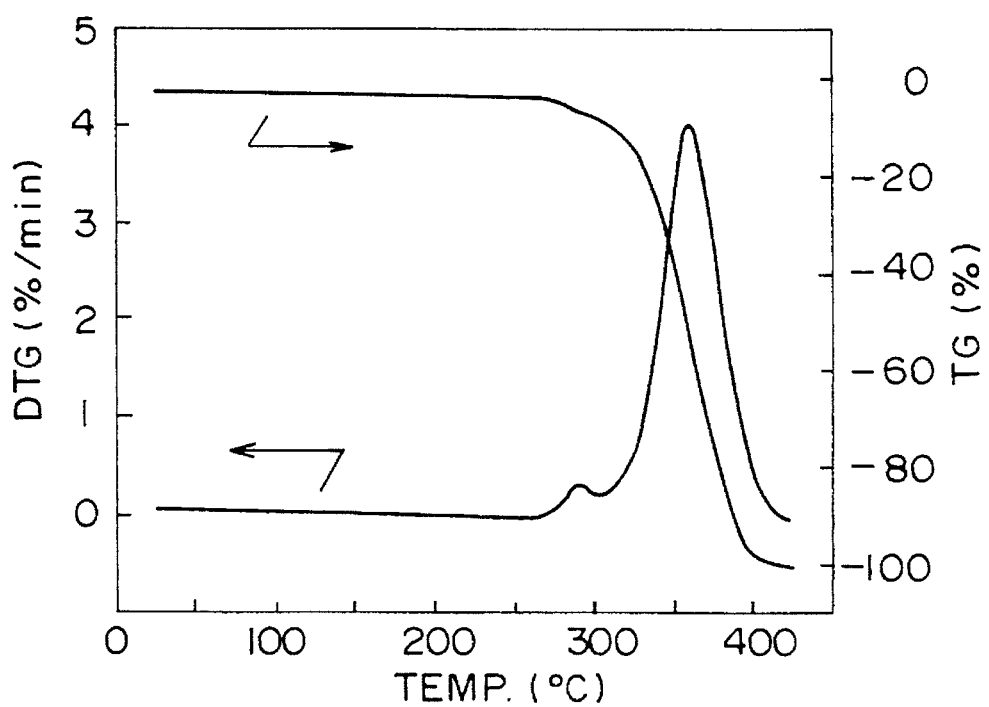
FIG. 8 shows the TG curve and the DTG curve of a polymer subjected to the vacuum volatilization in Comparative Example 12.

For the polymer (which did not undergo heat history) obtained by precipitating and purifying the resulting reaction solution which flowed out from the second reactor static mixer 15 hours after the start of the operation and the polymer (which underwent the heat history) subjected to vacuum volatilization at 250° C., thermal decomposition resistance was inspected as in Example 18, and the results are shown in FIGS. 7 and 8, respectively. The thermal decomposition starting temperatures of the polymer which flowed out from the second reactor and the polymer subjected to the vacuum volatilization at 250° C. were both 250° C. The decomposition ratio of the polymer which flowed from the second reactor till 300° C. was 7.0%. On both of DTG curves, two peaks appeared at about 280° C. and 370° C., but in the polymer subjected to the vacuum volatilization, the peak at 280° C. slightly decreased. It can be presumed that the polymer having terminal double bonds was partially decomposed at the time of the vacuum volatilization at 250° C.

The vacuum-devolatilized polymer was molded at 260° C. into disks having a diameter of 150 mm and a thickness of 3 mmby the use of a 75 t injection molding machine made by Arburg GmBH, but silver streaks were generated to make the molded articles hazy. The total light transmission of the molded articles was 90%.

TABLE 15

Concentrations of Material

| Composition of main feed in first tank (mol/l) | |
| --- | --- |
| Methyl methacrylate | 5.23 |
| Methyl acrylate | 0.27 |
| Toluene | 3.94 |
| n-dodecyl mercaptan | 0.002 |
| Di-tert-amyl peroxide | 0.002 |
| Composition of side-feed in plug flow type reactor (mol/l) | |
| Methyl methacrylate | 7.53 |
| Methyl acrylate | 2.19 |
| n-dodecyl mercaptan | 0.005 |
| Di-tert-amyl peroxide | 0.005 |
| Conditions of polymerization | |
| First tank | |
| Polymerization Temp. (°C.) | 140 |
| Average residence time θ (min) | 180 |
| Polymerization ratio in first tank (mol %) | 58.3 |
| Second stage static mixer | |
| Polymerization Temp. (°C.) | 140 |
| Flow time θ (min) | 120 |
| Polymerization ratio at outlet of second stage static mixer (mol %) | 88.2 |
| Value of formula (7) | $9.2 \times 10^6$ |
| Value of formula (8) | $2.8 \times 10^3$ |
| Value of formula (9) | $1.5 \times 10^{-4}$ |
| Thermal decomposition ratio of polymer which did not undergo heat history (wt %) | 7.0 |

COMPARATIVE EXAMPLE 13

A composition comprising 63.8 parts of methyl methacrylate, 1.7 parts of methyl acrylate, 34.5 parts of methanol, 0.021 mol % of n-dodecyl mercaptan and 0.032 mol % of di-tert-butyl peroxide was continuously fed to a first tank at 1.67 kg/hr, and another composition comprising 90.0 parts of methyl methacrylate, 10.0 parts of methyl acrylate, 0.05 mol % of n-dodecyl mercaptan and 0.05 mol % of di-tert-butyl peroxide was introduced to a second stage static mixer at 110 kg/hr. In both the reactors, continuous polymerization was carried out at a polymerization temperature of 140° C. for an average residence time of 3 hours in the first tank and for a flow time of 2 hours in the second stage static mixer.

The operation was maintained at a polymerization ratio of 62.7% in the first stage and at a polymerization ratio of 88.0% in the second stage so that the weight-average molecular weight of the obtained polymer might be 100,000.

For the polymer obtained by precipitating and purifying the resulting reaction solution which flowed out from the static mixer 15 hours after the start of the operation and the polymer subjected to vacuum volatilization at 250° C., thermal decomposition resistance was inspected, and as a result, the thermal decomposition starting temperatures of both the polymer samples were 250° C.

The decomposition ratio of the polymer which flowed from the second reactor till 300° C. at which zipper decomposition substantially occurred was 9.5%. On both of DTG curves, two peaks appeared at about 280° C. and 370° C., but in the polymer subjected to the vacuum volatilization, the peak at 280° C. slightly decreased. It can be presumed that the polymer having terminal double bonds was partially decomposed at the time of the vacuum volatilization at 250° C.

What is claimed is:

1. A process for preparing a methyl methacrylate polymer which comprises polymerizing a monomer comprising methyl methacrylate alone or a mixture of 75% by weight or more of methyl methacrylate and 25% by weight or less of an alkyl acrylate having an alkyl group of 1 to 4 carbon atoms in the presence of a radical polymerization initiator, a chain transfer agent, and methanol as a solvent, the methanol being in an amount of 10 to 25% by weight based on a total weight of the monomer and methanol; the polymerization being carried out in a uniform solution, wherein a material feed composition comprising the monomer, the methanol as the solvent, the radical polymerization initiator and the chain transfer agent are prepared so that the radical polymerization initiator has a concentration in the material feed composition of $1.0 \times 10^{-3}$ to 1.6 mol % and the chain transfer agent has a concentration in the material feed composition of $1.0 \times 10^{-3}$ to 3.7 mol %; and in a first complete stirring tank, the monomer is continuously polymerized at a polymerization temperature of 130° to 170° C. for an average residence time which is 5 to 7,000 times as much as a half-value period of the polymerization initiator at the polymerization temperature, while a conversion of the monomer is maintained at 65 to 90%, wherein the polymerization is carried out under conditions which meet the following formulae (1) to (3):

formula (1):

$$(7.0 \times 10^7 \leq C^2(\tau+\Theta)e^{4529/T})/(I \cdot \Theta^2 \leq 3.0 \times 10^9)$$

formula (2):

$$100 \leq M/D + E + F \leq 40,000$$

formula (3):

$$4.0 \times 10^{-7} \leq I/M \cdot \Theta/\tau + \Theta \cdot (2.0 \times 10^{-3} \cdot R^2 - 8.5 \times 10^{-2} \cdot R + 1) \leq 1.0 \times 10^{-4},$$

wherein C is the monomer conversion (mol %) τ is the half-value period in minutes of the radical polymerization initiator, Θ is the average residence time in minutes, T is the polymerization temperature in absolute temperature, I is the concentration in mols/liter of the radical polymerization initiator in the feed, M is the concentration in mols/liter of the monomer in the feed, and R is a constant calculated from the monomer conversion and the concentration of the acrylate in the monomer in the feed, and is defined by the following formula:

$$R = m \cdot (3.7 \times 10^{-3} \cdot C + 0.63),$$

wherein m is the concentration in mol % of the acrylate in the monomer in the feed; and D, E and F are defined by the following formulae:

$$D = (7.75 \times 10^3 e^{-3674/T} \cdot X)/(100 + (7.75 \times 10^3 e^{-3674/T} - 1) \cdot C)$$

$$E = (423 e^{-6021/T} \cdot S)/(100 + (423 e^{-6021/T} - 1) \cdot C)$$

$$F = (1.13 \times 10^{-4} e^{4529/T} \cdot C)/(\Theta \cdot (100 - C)^2)$$

wherein X is the concentration in mols/liter of the chain transfer agent in the feed; and S is the concentration in mols/liter of the solvent.

2. The process according to claim 1 wherein the radical polymerization initiator is selected from the group consisting of isobutyl peroxide, di-tert-butyl peroxide, di-tertamyl peroxide, acetyl peroxide, dicumyl peroxide, benzoyl peroxide, lauroyl peroxide, 3,5,5-trimethylhexanoyl peroxide, tert-butyl peroxyisobutyrate, tert-butyl peroxybenzoate, tert-butyl peroxyneodecanote, tert-butyl peroxypivalate, tert-butyl peroxy(2-ethylhexanoate), di-isopropyl peroxydicarbonate, tert-butyl peroxyisopropylcarbonate, tert-hexyl peroxyisopropylcarbonate, di-2-ethylhexyl peroxydicarbonate, 2,2'-azobis(4-methoxy-2,4-dimethylvaleronitrile), 2,2'-azobis(2,4-dimethylvaleronitrile), dimethyl-2,2'-azobisisobutyrate, 2,2'-azobis(2-methylbutyronitrile), 2,2'-azobisisobutyrate and 1,1'-azobis(1-cyclohexanecarbonitrile).

3. The process according to claim 2 wherein the chain transfer agent is selected from the group consisting of n-butyl mercaptan, isobutyl mercaptan, n-octyl mercaptan, n-dodecyl mercaptan, tert-butyl mercaptan and isoctyl thioglycolate.

4. The process according to claim 1 wherein chain transfer agent is selected from the group consisting of n-butyl mercaptan, isobutyl mercaptan, n-octyl mercaptan, n-dodecyl mercaptan and isooctyl thioglycolate.

* * * * *